(12) United States Patent
Shpilyuck et al.

(10) Patent No.: US 12,021,696 B2
(45) Date of Patent: Jun. 25, 2024

(54) DATA CENTER MONITORING AND MANAGEMENT OPERATION INCLUDING MICROSERVICE CENTRALITY CALCULATION OPERATION

(71) Applicant: Dell Products L.P., Round Rock, TX (US)

(72) Inventors: Boris Shpilyuck, Ashdod (IL); Igor Dubrovsky, Savyon (IL); Nisan Haimov, Beer Sheva (IL)

( * ) Notice: Subject to any disclaimer, the term of this patent is extended or adjusted under 35 U.S.C. 154(b) by 31 days.

(21) Appl. No.: 17/993,729

(22) Filed: Nov. 23, 2022

(65) Prior Publication Data

US 2024/0171464 A1 May 23, 2024

(51) Int. Cl.
*G06F 15/173* (2006.01)
*H04L 41/0893* (2022.01)
*H04L 41/12* (2022.01)

(52) U.S. Cl.
CPC .......... *H04L 41/0893* (2013.01); *H04L 41/12* (2013.01)

(58) Field of Classification Search
CPC ........................... H04L 41/0893; H04L 41/12
See application file for complete search history.

(56) References Cited

U.S. PATENT DOCUMENTS

| | | | |
|---|---|---|---|
| 2021/0149787 A1* | 5/2021 | Nguyen | G06F 11/3495 |
| 2021/0294717 A1* | 9/2021 | Wang | G06F 11/3419 |
| 2023/0021373 A1* | 1/2023 | Kabbinale | G06F 11/0712 |

* cited by examiner

*Primary Examiner* — Joseph R Maniwang
(74) *Attorney, Agent, or Firm* — Terrile, Cannatti & Chambers, LLP; Stephen A. Terrile

(57) ABSTRACT

A system, method, and computer-readable medium for performing a data center management and monitoring operation. The data center management and monitoring operation includes: identifying a plurality of process flows, each of the plurality of process flows having a trace identifier and a corresponding weighted priority; identifying a plurality of microservices associated with each of the plurality of process flows; mapping each of the plurality of microservices associated with each of the plurality of process flows; and, calculating a centrality value for each of the plurality of microservices associated with each of the plurality of process flows based upon the mapping.

17 Claims, 12 Drawing Sheets

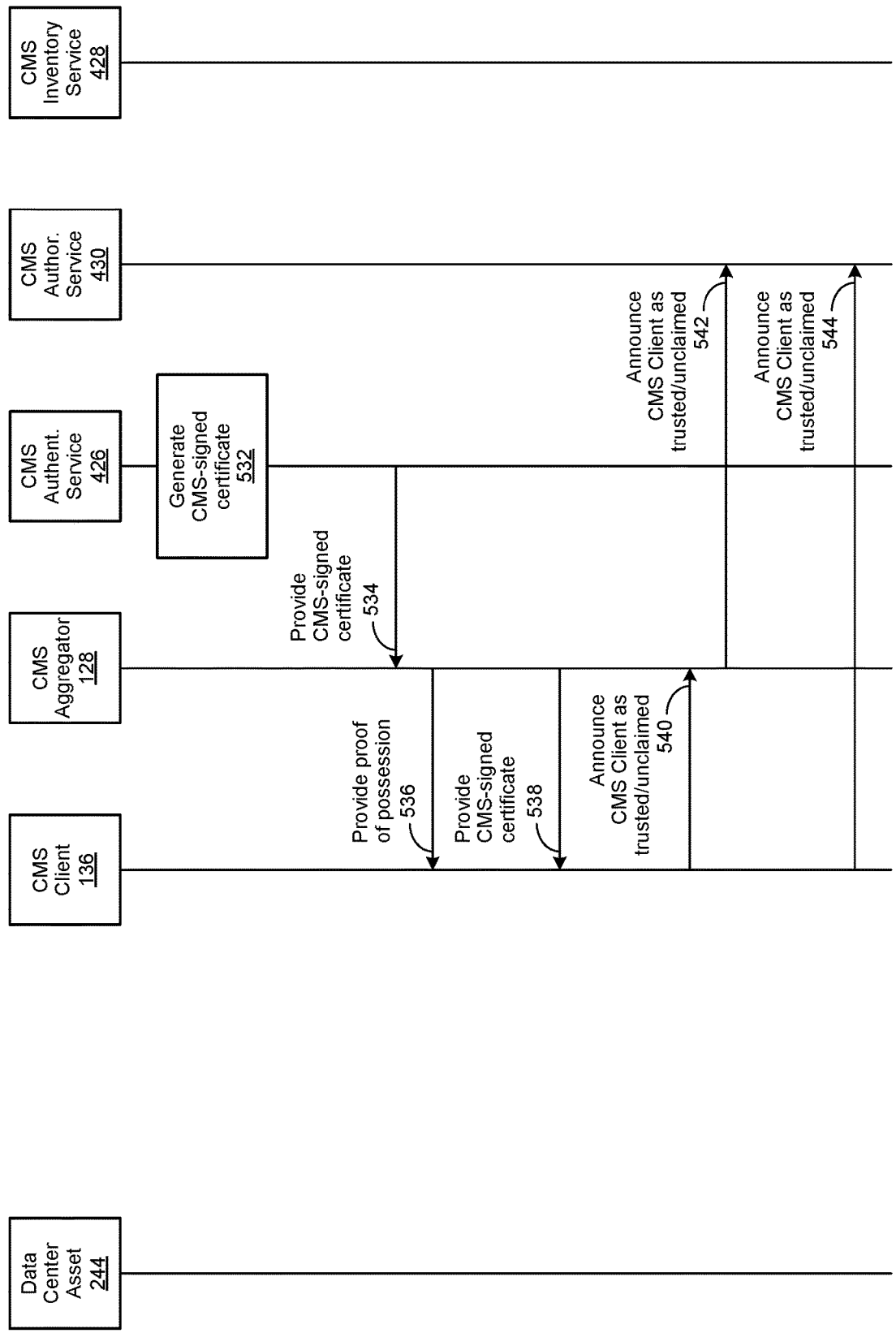

DATA CENTER MONITORING AND MANAGEMENT OPERATION INCLUDING MICROSERVICE CENTRALITY CALCULATION OPERATION

BACKGROUND OF THE INVENTION

Field of the Invention

The present invention relates to information handling systems. More specifically, embodiments of the invention relate to performing a data center monitoring and management operation.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY OF THE INVENTION

In one embodiment the invention relates to a method for performing a data center management and monitoring operation, comprising: identifying a plurality of process flows, each of the plurality of process flows having a trace identifier and a corresponding weighted priority; identifying a plurality of microservices associated with each of the plurality of process flows; mapping each of the plurality of microservices associated with each of the plurality of process flows; and, calculating a centrality value for each of the plurality of microservices associated with each of the plurality of process flows based upon the mapping.

In another embodiment the invention relates to a system comprising: a processor; a data bus coupled to the processor; a data center asset client module; and, a non-transitory, computer-readable storage medium embodying computer program code, the non-transitory, computer-readable storage medium being coupled to the data bus, the computer program code interacting with a plurality of computer operations and comprising instructions executable by the processor and configured for: identifying a plurality of process flows, each of the plurality of process flows having a trace identifier and a corresponding weighted priority; identifying a plurality of microservices associated with each of the plurality of process flows; mapping each of the plurality of microservices associated with each of the plurality of process flows; and, calculating a centrality value for each of the plurality of microservices associated with each of the plurality of process flows based upon the mapping.

In another embodiment the invention relates to a computer-readable storage medium embodying computer program code, the computer program code comprising computer executable instructions configured for: identifying a plurality of process flows, each of the plurality of process flows having a trace identifier and a corresponding weighted priority; identifying a plurality of microservices associated with each of the plurality of process flows; mapping each of the plurality of microservices associated with each of the plurality of process flows; and, calculating a centrality value for each of the plurality of microservices associated with each of the plurality of process flows based upon the mapping.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 5a through 5d, generally referred to as FIG. 5, are a sequence diagram showing the performance of certain connectivity management operations;

DETAILED DESCRIPTION

Figure 1:
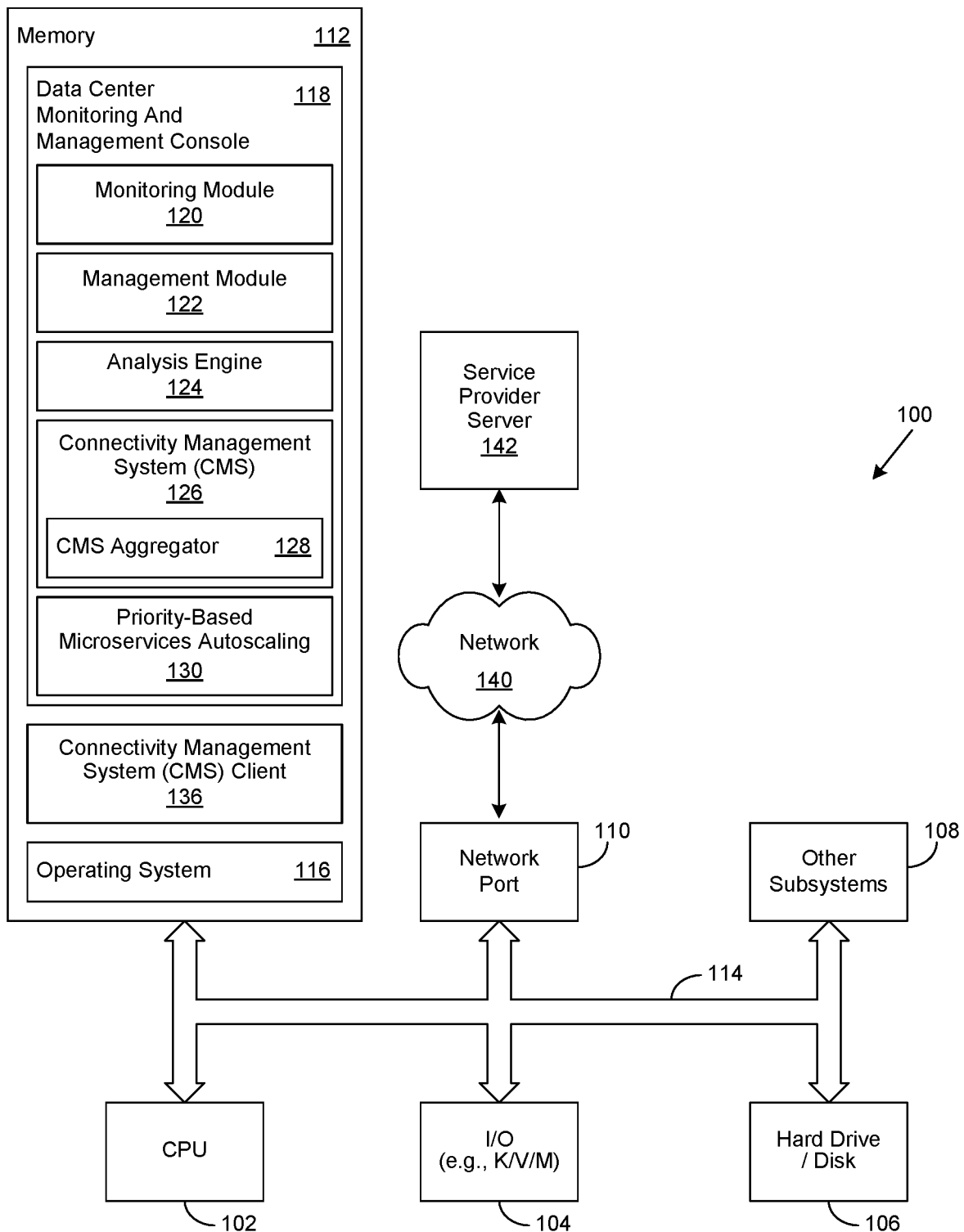
FIG. 1 shows a general illustration of components of an information handling system as implemented in the system and method of the present invention.

A system, method, and computer-readable medium are disclosed for performing a data center monitoring and management operation, described in greater detail herein. Various aspects of the invention reflect an appreciation that it is common for a typical data center to monitor and manage tens, if not hundreds, of thousands of different assets, such as certain computing and networking devices, described in greater detail herein. Certain aspects of the invention likewise reflect an appreciation that such data center assets are typically implemented to work in combination with one another for a particular purpose. Likewise, various aspects of the invention reflect an appreciation that such purposes generally involve the performance of a wide variety of tasks, operations, and processes to service certain workloads.

Certain aspects of the invention likewise reflect an appreciation that the use of cloud-based data center management systems often proves to be advantageous as they allow monitoring and management functions to be performed from anywhere, at any time, according to the user's particular needs, and typically at a reduced cost. Likewise, certain aspects of the invention reflect an appreciation that such cloud-based approaches may be implemented as a service to provide effective, and often advanced, monitoring and management of a customer's on-premise data center assets, as described in greater detail herein. For example, it is not uncommon for certain microservices workloads to be run within on-premise computing environments, such as private and hybrid clouds, or in edge computing environments, due to performance or security considerations. In particular, such computing environments are generally located close to where a workload or process is performed to realize better performance and lower latency than what can typically be achieved by cloud-based implementations. Likewise, even the most demanding security requirements can usually be met as such environments are typically managed and controlled by the organizations that operate them.

However, on-premise and edge computing environments generally do not have access to the highly-scalable compute resources (e.g., processor, memory, storage, network, etc.) inherently available to hyperscalers such as Amazon Web Services (AWS®), Microsoft® Azure®, and others. Accordingly, there may not be sufficient compute resources to accommodate every microservice invoked for every workload during peak activity periods. As a result, some performance degradation may be likely for those workloads due to traditional autoscaling approaches typically used to accommodate such increases in demand.

Furthermore, certain aspects of the invention reflect an appreciation that workloads typically consist of numerous process flows, each of which may differ in their respective criticality. Consequently, it may be challenging to determine which workload should be given prioritization to use a particular microservice instance. For example, a process flow associated with conducting an ecommerce purchase transaction may be considered critical, while a process flow associated with statistics and order details related to past purchases may be less so. Accordingly, microservices involved in both process flows should be given priority to the purchase transaction process flow rather than the process flow associated with past purchases.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

FIG. 1 is a generalized illustration of an information handling system 100 that can be used to implement the system and method of the present invention. The information handling system 100 includes a processor (e.g., central processor unit or "CPU") 102, input/output (I/O) devices 104, such as a display, a keyboard, a mouse, a touchpad or touchscreen, and associated controllers, a hard drive or disk storage 106, and various other subsystems 108. In various embodiments, the information handling system 100 also includes network port 110 operable to connect to a network 140, which is likewise accessible by a service provider server 142. The information handling system 100 likewise includes system memory 112, which is interconnected to the foregoing via one or more buses 114. System memory 112 further comprises operating system (OS) 116 and in various embodiments may also comprise a data center monitoring and management console 118, or a connectivity management system (CMS) client 136. In one embodiment, the information handling system 100 is able to download the data center monitoring and management console 118, or the CMS client 136, or both, from the service provider server 142. In another embodiment, the functionality respectively provided by the data center monitoring and management console 118, or the CMS client 136, or both, may be provided as a service from the service provider server 142.

In certain embodiments, the data center monitoring and management console 118 may include a monitoring module 120, a management module 122, an analysis engine 124, a connectivity management system (CMS) 126, a priority-based microservices autoscaling system 130, or a combination thereof. In certain embodiments, the CMS 126 may be implemented to include a CMS aggregator 128. In certain embodiments, the data center monitoring and management console 118 may be implemented to perform a data center monitoring and management operation. In certain embodiments, the information handling system 100 may be implemented to include either a CMS 126, or a CMS client 136, or both.

In certain embodiments, the data center monitoring and management operation may be performed during operation of an information handling system 100. In various embodiments, performance of the data center monitoring and management operation may result in the realization of improved monitoring and management of certain data center assets, as described in greater detail herein. In certain embodiments, the CMS 126 may be implemented in combination with the CMS client 136 to perform a connectivity management operation, described in greater detail herein. As an example, the CMS 126 may be implemented on one information handling system 100, while the CMS client 136 may be implemented on another, as likewise described in greater detail herein.

Figure 2:
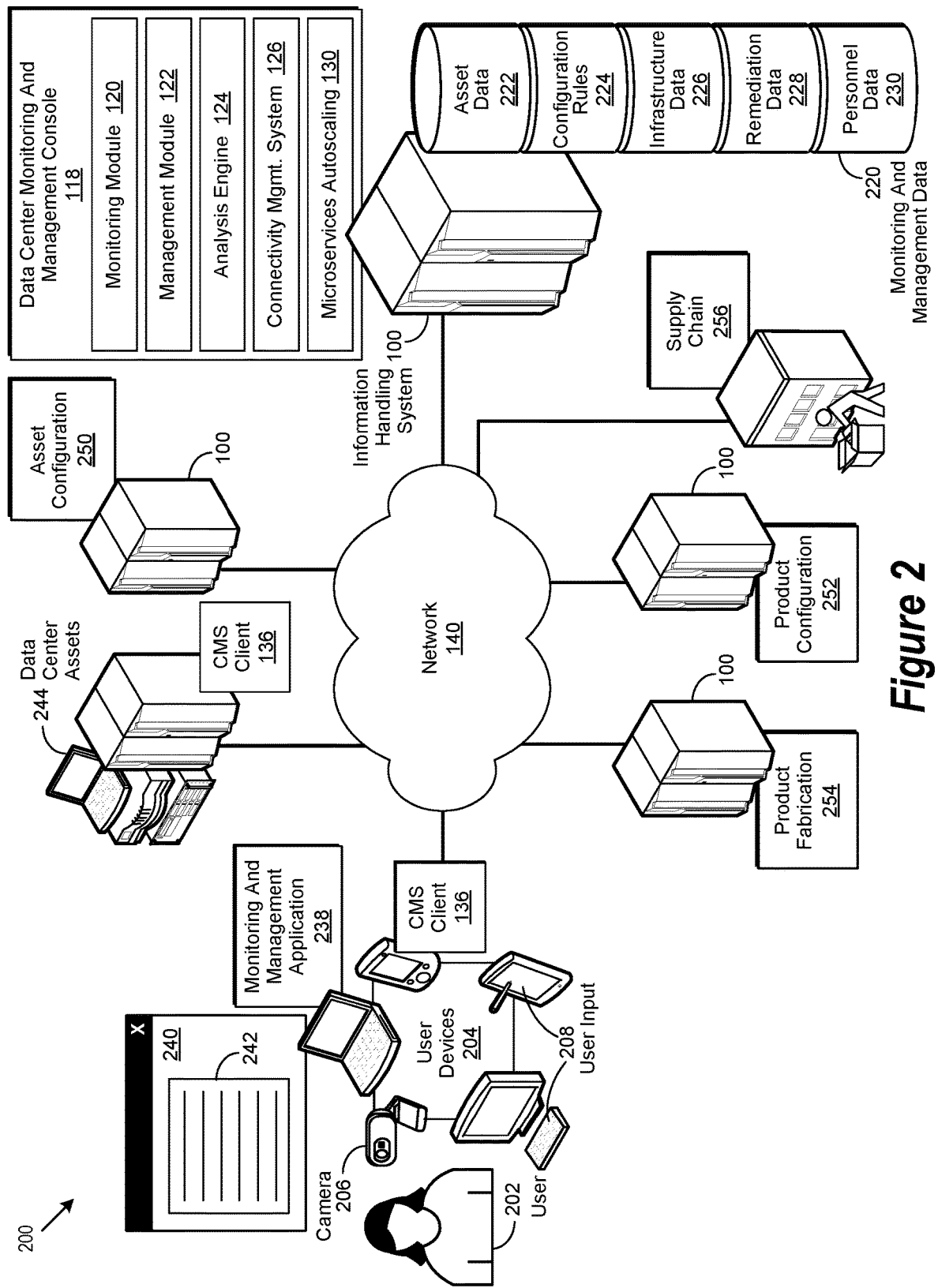
FIG. 2 shows a block diagram of a data center system monitoring and management environment.

FIG. 2 is a simplified block diagram of a data center monitoring and management environment implemented in accordance with an embodiment of the invention. As used herein, a data center broadly refers to a building, a dedicated space within a building, or a group of buildings, used to house a collection of interrelated data center assets 244 implemented to work in combination with one another for a particular purpose. As likewise used herein, a data center asset 244 broadly refers to anything, tangible or intangible, that can be owned, controlled, or enabled to produce value as a result of its use within a data center. In certain embodiments, a data center asset 244 may include a product, or a service, or a combination of the two.

As used herein, a tangible data center asset 244 broadly refers to a data center asset 244 having a physical substance, such as a computing or network device. Examples of computing devices may include personal computers (PCs), laptop PCs, tablet computers, servers, mainframe computers, Redundant Arrays of Independent Disks (RAID) storage units, their associated internal and external components, and so forth. Likewise, examples of network devices may include routers, switches, hubs, repeaters, bridges, gateways, and so forth. Other examples of a tangible data center asset 244 may include certain data center personnel, such as a data center system administrator, operator, or technician, and so forth. Other examples of a tangible data center asset 244 may include certain maintenance, repair, and operations (MRO) items, such as replacement and upgrade parts for a particular data center asset 244. In certain embodiments, such MRO items may be in the form of consumables, such as air filters, fuses, fasteners, and so forth.

As likewise used herein, an intangible data center asset 244 broadly refers to a data center asset 244 that lacks physical substance. Examples of intangible data center assets 244 may include software applications, software services, firmware code, and other non-physical, computer-based assets. Other examples of intangible data center assets 244 may include digital assets, such as structured and unstructured data of all kinds, still images, video images, audio recordings of speech and other sounds, and so forth. Further examples of intangible data center assets 244 may include intellectual property, such as patents, trademarks, copyrights, trade names, franchises, goodwill, and knowledge resources, such as data center asset 244 documentation. Yet other examples of intangible data center assets 244 may include certain tasks, functions, operations, procedures, or processes performed by data center personnel. Those of skill in the art will recognize that many such examples of tangible and intangible data center assets 244 are possible. Accordingly, the foregoing is not intended to limit the spirit, scope or intent of the invention.

In certain embodiments, the value produced by a data center asset 244 may be tangible or intangible. As used herein, tangible value broadly refers to value that can be measured. Examples of tangible value may include return on investment (ROI), total cost of ownership (TCO), internal rate of return (IRR), increased performance, more efficient use of resources, improvement in sales, decreased customer support costs, and so forth. As likewise used herein, intangible value broadly refers to value that provides a benefit that may be difficult to measure. Examples of intangible value may include improvements in user experience, customer support, and market perception. Skilled practitioner of the art will recognize that many such examples of tangible and intangible value are possible. Accordingly, the foregoing is not intended to limit the spirit, scope or intent of the invention.

In certain embodiments, the data center monitoring and management environment 200 may include a data center monitoring and management console 118. In certain embodiments, the data center monitoring and management console 118 may be implemented to perform a data center monitoring and management operation. As used herein, a data center monitoring and management operation broadly refers to any task, function, procedure, or process performed, directly or indirectly, within a data center monitoring and management environment 200 to procure, deploy, configure, implement, operate, monitor, manage, maintain, or remediate a data center asset 244.

In certain embodiments, a data center monitoring and management operation may include a data center monitoring task. As used herein, a data center monitoring task broadly refers to any function, operation, procedure, or process performed, directly or indirectly, within a data center monitoring and management environment 200 to monitor the operational status of a particular data center asset 244. In various embodiments, a particular data center asset 244 may be implemented to generate an alert if its operational status exceeds certain parameters. In these embodiments, the definition of such parameters, and the method by which they may be selected, is a matter of design choice.

For example, an internal cooling fan of a server may begin to fail, which in turn may cause the operational temperature of the server to exceed its rated level. In this example, the server may be implemented to generate an alert, which provides notification of the occurrence of a data center issue. As used herein, a data center issue broadly refers to an operational situation associated with a particular component of a data monitoring and management environment 200, which if not corrected, may result in negative consequences. In certain embodiments, a data center issue may be related to the occurrence, or predicted occurrence, of an anomaly within the data center monitoring and management environment 200. In certain embodiments, the anomaly may be related to unusual or unexpected behavior of one or more data center assets 244.

In certain embodiments, a data center monitoring and management operation may include a data center management task. As used herein, a data center management task broadly refers to any function, operation, procedure, or process performed, directly or indirectly, within a data center monitoring and management environment 200 to manage a particular data center asset 244. In certain embodiments, a data center management task may include a data center deployment operation, a data center remediation operation, a data center remediation documentation operation, a connectivity management operation, or a combination thereof.

As used herein, a data center deployment operation broadly refers to any function, task, procedure, or process performed, directly or indirectly, within a data center monitoring and management environment 200 to install a software file, such as a configuration file, a new software application, a version of an operating system, and so forth, on a data center asset 244. As likewise used herein, a data center remediation operation broadly refers to any function, task, procedure, or process performed, directly or indirectly, within a data center monitoring and management environment 200 to correct an operational situation associated with a component of a data monitoring and management environment 200, which if not corrected, may result in negative consequences. A data center remediation documentation operation, as likewise used herein, broadly refers to any function, task, procedure, or process performed, directly or indirectly, within a data center monitoring and management environment 200 to retrieve, generate, revise, update, or store remediation documentation that may be used in the performance of a data center remediation operation.

Likewise, as used herein, a connectivity management operation (also referred to as a data center connectivity management operation) broadly refers to any task, function, procedure, or process performed, directly or indirectly, to manage connectivity between a particular data center asset 244 and a particular data center monitoring and management console 118. In various embodiments, one or more connectivity management operations may be performed to ensure that data exchanged between a particular data center asset 244 and a particular data center monitoring and management console 118 during a communication session is secured. In certain of these embodiments, as described in greater detail herein, various cryptographic approaches familiar to skilled practitioners of the art may be used to secure a particular communication session.

In certain embodiments, the data center monitoring and management console 118 may be implemented to receive an alert corresponding to a particular data center issue. In various embodiments, the data center monitoring and management console 118 may be implemented to receive certain data associated with the operation of a particular data center asset 244. In certain embodiments, such operational data may be received through the use of telemetry approaches familiar to those of skill in the art. In various embodiments, the data center monitoring console 118 may be implemented to process certain operational data received from a particular data center asset to determine whether a data center issue has occurred, is occurring, or is anticipated to occur.

In certain embodiments, the data center monitoring and management console 118 may be implemented to include a monitoring module 120, a management monitor 122, an analysis engine 124, and a connectivity management system (CMS) 126, and a priority-based microservices autoscaling system 130, or a combination thereof. In certain embodiments, the monitoring module 120 may be implemented to monitor the procurement, deployment, implementation, operation, management, maintenance, or remediation of a particular data center asset 244 at any point in its lifecycle. In certain embodiments, the management module 122 may be implemented to manage the procurement, deployment, implementation, operation, monitoring, maintenance, or remediation of a particular data center asset 244 at any point in its lifecycle.

In various embodiments, the monitoring module 120, the management module 122, the analysis engine 124, and the CMS 126, and the priority-based microservices autoscaling system 130, may be implemented, individually or in combination with one another, to perform a data center asset monitoring and management operation, as likewise described in greater detail herein. In various embodiments, a CMS client 136 may be implemented on certain user devices 204, or certain data center assets 244, or a combination thereof. In various embodiments, the CMS 126 may be implemented in combination with a particular CMS client 136 to perform a connectivity management operation, as described in greater detail herein. In various embodiments, the CMS 126 may likewise be implemented in combination with the priority-based microservices autoscaling system 130 to perform a data center monitoring and management operation, described in greater detail herein. In certain embodiments, a data center monitoring and management operation may be implemented to include one or more priority-based microservices operations, likewise described in greater detail herein.

In certain embodiments, the data center monitoring and management environment 200 may include a repository of data center monitoring and management data 220. In certain embodiments, the repository of data center monitoring and management data 220 may be local to the information handling system 100 executing the data center monitoring and management console 118 or may be located remotely. In various embodiments, the repository of data center monitoring and management data 220 may include certain information associated with data center asset data 220, data center asset configuration rules 224, data center infrastructure data 226, data center remediation data 228, and data center personnel data 230.

As used herein, data center asset data 222 broadly refers to information associated with a particular data center asset 244, such as an information handling system 100, or an associated workload, that can be read, measured, and structured into a usable format. For example, data center asset data 222 associated with a particular server may include the number and type of processors it can support, their speed and architecture, minimum and maximum amounts of memory supported, various storage configurations, the number, type, and speed of input/output channels and ports, and so forth. In various embodiments, the data center asset data 222 may likewise include certain performance and configuration information associated with a particular workload, as described in greater detail herein. In various embodiments, the data center asset data 222 may include certain public or proprietary information related to data center asset 244 configurations associated with a particular workload.

In certain embodiments, the data center asset data 222 may include information associated with data center asset 244 types, quantities, locations, use types, optimization types, workloads, performance, support information, and cost factors, or a combination thereof, as described in greater detail herein. In certain embodiments, the data center asset data 222 may include information associated with data center asset 244 utilization patterns, likewise described in greater detail herein. In certain embodiments, the data center asset data 222 may include information associated with the allocation of certain data center asset resources, described in greater detail herein, to a particular workload.

As likewise used herein, a data center asset configuration rule 224 broadly refers to a rule used to configure a particular data center asset 244. In certain embodiments, one or more data center asset configuration rules 224 may be used to verify that a particular data center asset 244 configuration is the most optimal for an associated location, or workload, or to interact with other data center assets 244, or a combination thereof, as described in greater detail herein. In certain embodiments, the data center asset configuration rule 224 may be used in the performance of a data center asset configuration verification operation, a data center remediation operation, or a combination of the two. In certain embodiments, the data center asset configuration verification operation, or the data center remediation operation, or both, may be performed by an asset configuration system 250. In certain embodiments, the asset configuration system 250 may be used in combination with the data center monitoring and management console 118 to perform a data center asset configuration operation, or a data center remediation operation, or a combination of the two.

As used herein, data center infrastructure 226 data broadly refers to any data associated with a data center infrastructure component. As likewise used herein, a data center infrastructure component broadly refers to any component of a data center monitoring and management environment 200 that may be involved, directly or indirectly, in the procurement, deployment, implementation, configuration, operation, monitoring, management, maintenance, or remediation of a particular data center asset 244. In certain embodiments, data center infrastructure components may include physical structures, such as buildings, equipment racks and enclosures, network and electrical cabling, heating, cooling, and ventilation (HVAC) equipment and associated ductwork, electrical transformers and power conditioning systems, water pumps and piping systems, smoke and fire suppression systems, physical security systems and associated peripherals, and so forth. In various embodiments, data center infrastructure components may likewise include the provision of certain services, such as network connectivity, conditioned airflow, electrical power, and water, or a combination thereof.

Data center remediation data 228, as used herein, broadly refers to any data associated with the performance of a data center remediation operation, described in greater details herein. In certain embodiments, the data center remediation data 228 may include information associated with the remediation of a particular data center issue, such as the date and time an alert was received indicating the occurrence of the data center issue. In certain embodiments, the data center remediation data 228 may likewise include the amount of elapsed time before a corresponding data center remediation operation was begun after receiving the alert, and the amount of elapsed time before it was completed. In various embodiments, the data center remediation data 228 may include information related to certain data center issues, the frequency of their occurrence, their respective causes, error codes associated with such data center issues, the respective location of each data center asset 244 associated with such data center issues, and so forth.

In various embodiments, the data center remediation data 228 may include information associated with data center asset 244 replacement parts, or upgrades, or certain third party services that may need to be procured in order to perform the data center remediation operation. Likewise, in certain embodiments, related data center remediation data 228 may include the amount of elapsed time before the replacement parts, or data center asset 244 upgrades, or third party services were received and implemented. In certain embodiments, the data center remediation data 228 may include information associated with data center personnel who may have performed a particular data center remediation operation. Likewise, in certain embodiments, related data center remediation data 228 may include the amount of time the data center personnel actually spent performing the operation, issues encountered in performing the operation, and the eventual outcome of the operation that was performed.

In certain embodiments, the data center remediation data 228 may include remediation documentation associated with performing a data center asset remediation operation associated with a particular data center asset 244. In various embodiments, such remediation documentation may include information associated with certain attributes, features, characteristics, functional capabilities, operational parameters, and so forth, of a particular data center asset 244. In certain embodiments, such remediation documentation may likewise include information, such as step-by-step procedures and associated instructions, video tutorials, diagnostic routines and tests, checklists, and so forth, associated with remediating a particular data center issue.

In certain embodiments, the data center remediation data 228 may include information associated with any related remediation dependencies, such as other data center remediation operations that may need to be performed beforehand. In certain embodiments, the data center remediation data 228 may include certain time restrictions when a data center remediation operation, such as rebooting a particular server, may be performed. In various embodiments, the data center remediation data 228 may likewise include certain autonomous remediation rules, described in greater detail herein. In various embodiments, certain of these autonomous remediation rules may be used in the performance of an autonomous remediation operation, described in greater detail herein. Those of skill in the art will recognize that many such examples of data center remediation data 228 are possible. Accordingly, the foregoing is not intended to limit the spirit, scope, or intent of the invention.

Data center personnel data 230, as used herein, broadly refers to any data associated with data center personnel who may be directly, or indirectly, involved in the procurement, deployment, configuration, implementation, operation, monitoring, management, maintenance, or remediation of a particular data center asset 244. In various embodiments, the data center personnel data 230 may include job title, work assignment, or responsibility information corresponding to certain data center personnel. In various embodiments, the data center personnel data 230 may include information related to the type, and number, of data center remediation operations currently being, or previously, performed by certain data center personnel. In various embodiments, the data center personnel data 230 may include historical information, such as success metrics, associated with data center remediation operations performed by certain data center personnel, such as data center administrators, operators, and technicians. In these embodiments, the data center personnel data 230 may be updated as individual data center personnel complete each data center remediation task, described in greater detail herein, they are assigned.

In various embodiments, the data center personnel data 230 may likewise include education, certification, and skill level information corresponding to certain data center personnel. Likewise, in various embodiments, the data center personnel data 230 may include security-related information, such as security clearances, user IDs, passwords, security-related biometrics, authorizations, and so forth, corresponding to certain data center personnel. Those of skill in the art will recognize that many such examples of data center personnel data 230 are possible. Accordingly, the foregoing is not intended to limit the spirit, scope, or intent of the invention.

In certain embodiments, various data center assets 244 within a data center monitoring and management environment 200 may have certain interdependencies. As an example, a data center monitoring and management environment 200 may have multiple servers interconnected by a storage area network (SAN) providing block-level access to various disk arrays and tape libraries. In this example, the servers, various physical and operational elements of the SAN, as well the disk arrays and tape libraries, are interdependent upon one another.

In certain embodiments, each data center asset 244 in a data center monitoring and management environment 200 may be treated as a separate data center asset 244 and depreciated individually according to their respective attributes. As an example, a particular rack of servers in a data center monitoring and management environment 200 may be made up of a variety of individual servers, each of which may have a different depreciation schedule. To continue the example, certain of these data center assets 244 may be implemented in different combinations to produce an end result. To further illustrate the example, a particular server in the rack of servers may initially be implemented to query a database of customer records. As another example, the same server may be implemented at later time perform an analysis of sales associated with those same customer records.

In certain embodiments, each data center asset 244 in a data center monitoring and management environment 200 may have an associated maintenance schedule and service contract. For example, a data center monitoring and management environment 200 may include a wide variety of servers and storage arrays, which may respectively be manufactured by a variety of manufacturers. In this example, the frequency and nature of scheduled maintenance, as well as service contract terms and conditions, may be different for each server and storage array. In certain embodiments, the individual data center assets 244 in a data center monitoring and management environment 200 may be configured differently, according to their intended use. To continue the previous example, various servers may be configured with faster or additional processors for one intended workload, while other servers may be configured with additional memory for other intended workloads. Likewise, certain storage arrays may be configured as one RAID configuration, while others may be configured as a different RAID configuration.

In certain embodiments, the data center monitoring and management environment 200 may likewise be implemented to include an asset configuration system 250, a product configuration system 252, a product fabrication system 254, and a supply chain system 256, or a combination thereof. In various embodiments, the asset configuration system 250 may be implemented to perform certain data center asset 244 configuration operations. In certain embodiments, the data center asset 244 configuration operation may be performed to configure a particular data center asset 244 for a particular purpose. In certain embodiments, the data center monitoring and management console 118 may be implemented to interact with the asset configuration system 250 to perform a particular data center asset 244 configuration operation. In various embodiments, the asset configuration system 250 may be implemented to generate, manage, and provide, or some combination thereof, data center asset configuration rules 224. In certain of these embodiments, the data center asset configuration rules 224 may be used to configure a particular data center asset 244 for a particular purpose.

In certain embodiments, a user 202 may use a user device 204 to interact with the data center monitoring and management console 118. As used herein, a user device 204 refers to an information handling system such as a personal computer, a laptop computer, a tablet computer, a personal digital assistant (PDA), a smart phone, a mobile telephone, or other device that is capable of processing and communicating data. In certain embodiments, the communication of the data may take place in real-time or near-real-time. As used herein, real-time broadly refers to processing and providing information within a time interval brief enough to not be discernable by a user 202.

In certain embodiments, a user device 204 may be implemented with a camera 206, such as a video camera known to skilled practitioners of the art. In certain embodiments, the camera 206 may be integrated into the user device 204. In certain embodiments, the camera 206 may be implemented as a separate device configured to interoperate with the user device 204. As an example, a webcam familiar to those of skill in the art may be implemented receive and communicate various image and audio signals to a user device 204 via a Universal Serial Bus (USB) interface. In certain embodiments, the user device 204 may be configured to present a data center monitoring and management console user interface (UI) 240. In certain embodiments, the data center monitoring and management console UI 240 may be implemented to present a graphical representation 242 of data center asset monitoring and management information, which is automatically generated in response to interaction with the data center monitoring and management console 118.

In certain embodiments, a data center monitoring and management application 238 may be implemented on a particular user device 204. In various embodiments, the data center monitoring and management application 238 may be implemented on a mobile user device 204, such as a laptop computer, a tablet computer, a smart phone, a dedicated-purpose mobile device, and so forth. In certain of these embodiments, the mobile user device 204 may be used at various locations within the data center monitoring and management environment 200 by the user 202 when performing a data center monitoring and management operation, described in greater detail herein.

In various embodiments, the data center monitoring and management application 238 may be implemented to facilitate a user 202, such as a data center administrator, operator, or technician, to perform a particular data center remediation operation. In various embodiments, such facilitation may include using the data center monitoring and management application 238 to receive a notification of a data center remediation task, described in greater detail herein, being assigned to the user. In certain embodiments, the data center monitoring and management console 118 may be implemented to generate the notification of the data center remediation task assignment, and assign it to the user, as likewise described in greater detail herein. In certain embodiments, the data center monitoring and management console 118 may be implemented to generate the data center remediation task, and once generated, provide it to the data center monitoring and management application 238 associated with the assigned user 202.

In certain embodiments, such facilitation may include using the data center monitoring and management application 238 to receive the data center remediation task from the data center monitoring and management console 118. In various embodiments, such facilitation may include using the data center monitoring and management application 238 to confirm that the user 202 is at the correct physical location of a particular data center asset 244 associated with a corresponding data center issue. In certain of these embodiments, the data center monitoring and management application 238 may be implemented to include certain Global Positioning System (GPS) capabilities, familiar to those of skill in the art, which may be used to determine the physical location of the user 202 in relation to the physical location of a particular data center asset 244.

In various embodiments, such facilitation may include using the data center monitoring and management application 238 to ensure the user 202 is aware of, or is provided the location of, or receives, or a combination thereof, certain remediation resources, described in greater detail herein, that may be needed to perform a particular data center remediation operation. In various embodiments, such facilitation may include using the data center monitoring and management application 238 to view certain remediation documentation, or augmented instructions, related to performing a particular data center remediation operation. In various embodiments, such facilitation may include using the data center monitoring and management application 238 to certify that a particular data center remediation operation has been performed successfully.

In certain embodiments the UI window 240 may be implemented as a UI window of the data center monitoring and management application 238. In various embodiments, the data center monitoring and management application 238 may be implemented to include, in part or in whole, certain functionalities associated with the data center monitoring and management console 118. In certain embodiments, the data center monitoring and management application 238 may be implemented to interact in combination with the data center monitoring and management console 118, and other components of the data center monitoring and management environment 200, to perform a data center monitoring and management operation.

In certain embodiments, the user device 204 may be used to exchange information between the user 202 and the data center monitoring and management console 118, the data center monitoring and management application 238, the asset configuration system 250, the product configuration system 252, the product fabrication system 254, and the supply chain system 256, or a combination thereof, through the use of a network 140. In various embodiments, the asset configuration system 250 may be implemented to configure a particular data center asset 244 to meet certain performance goals. In various embodiments, the asset configuration system 250 may be implemented to use certain data center monitoring and management data 220, certain data center asset configuration rules 226 it may generate or manage, or a combination thereof, to perform such configurations.

In various embodiments, the product configuration system 252 may be implemented to use certain data center monitoring and management data 220 to optimally configure a particular data center asset 244, such as a server, for an intended workload. In various embodiments, the data center monitoring and management data 220 used by the product configuration system 252 may have been generated as a result of certain data center monitoring and management operations, described in greater detail herein, being performed by the data center monitoring and management console 118. In various embodiments, the product configuration system 252 may be implemented to provide certain product configuration information to a product fabrication system 254. In various embodiments, the product fabrication system 254 may be implemented to provide certain product fabrication information to a product fabrication environment (not shown). In certain embodiments, the product fabrication information may be used by the product fabrication environment to fabricate a product, such as a server, to match a particular data center asset 244 configuration.

In various embodiments, the data center monitoring and management console UI 240 may be presented via a website (not shown). In certain embodiments, the website may be provided by one or more of the data center monitoring and management console 118, the asset configuration system 250, the product configuration system 252, the product fabrication system 254, or the supply chain system 256. In certain embodiments, the supply chain system 256 may be implemented to manage the provision, fulfillment, or deployment of a particular data center asset 244 produced in the product fabrication environment. For the purposes of this disclosure a website may be defined as a collection of related web pages which are identified with a common domain name and is published on at least one web server. A website may be accessible via a public IP network or a private local network.

A web page is a document which is accessible via a browser which displays the web page via a display device of an information handling system. In various embodiments, the web page also includes the file which causes the document to be presented via the browser. In various embodiments, the web page may comprise a static web page, which is delivered exactly as stored and a dynamic web page, which is generated by a web application that is driven by software that enhances the web page via user input 208 to a web server.

In certain embodiments, the data center monitoring and management console 118 may be implemented to interact with the asset configuration system 250, the product configuration system 252, the product fabrication system 254, and the supply chain or fulfillment system 256, or a combination thereof, each of which in turn may be executing on a separate information handling system 100. In certain embodiments, the data center monitoring and management console 118 may be implemented to interact with the asset configuration system 250, the product configuration system 252, the product fabrication system 254, and the supply chain or fulfillment system 256, or a combination thereof, to perform a data center monitoring and management operation, as described in greater detail herein.

Figure 3:
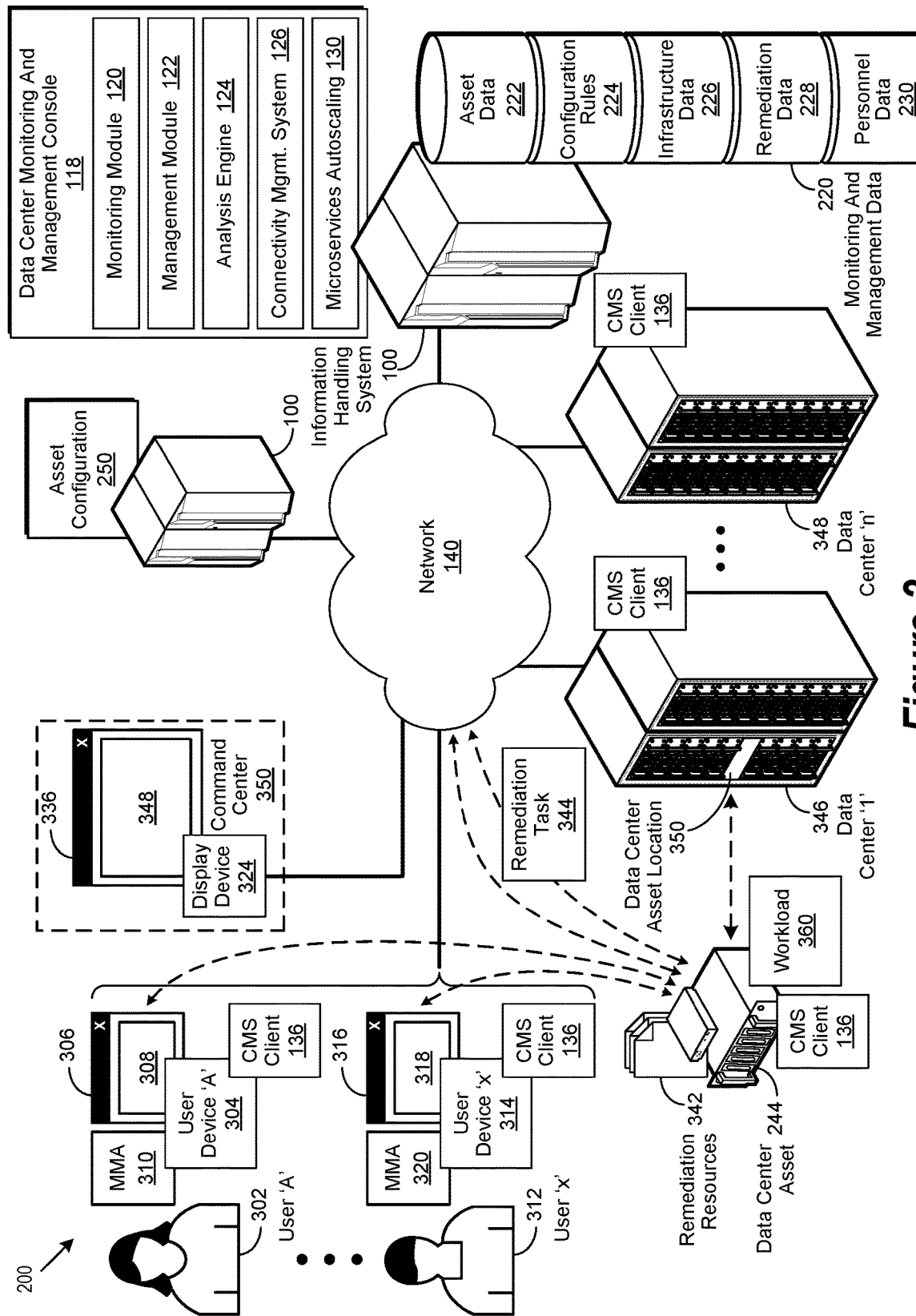
FIG. 3 shows a functional block diagram of the performance of certain data center monitoring and management operations.

FIG. 3 shows a functional block diagram of the performance of certain data center monitoring and management operations implemented in accordance with an embodiment of the invention. In various embodiments, a data center monitoring and management environment 200, described in greater detail herein, may be implemented to include one or more data centers, such as data centers '1' 346 through 'n' 348. As likewise described in greater detail herein, each of the data centers '1' 346 through 'n' 348 may be implemented to include one or more data center assets 244, likewise described in greater detail herein.

In certain embodiments, a data center asset 244 may be implemented to process an associated workload 360. A workload 360, as used herein, broadly refers to a measure of information processing that can be performed by one or more data center assets 244, individually or in combination with one another, within a data center monitoring and management environment 200. In certain embodiments, a workload 360 may be implemented to be processed in a virtual machine (VM) environment, familiar to skilled practitioners of the art. In various embodiments, a workload 360 may be implemented to be processed as a containerized workload 360, likewise familiar to those of skill in the art.

In certain embodiments, as described in greater detail herein, the data center monitoring and management environment 200 may be implemented to include a data center monitoring and management console 118. In certain embodiments, the data center monitoring and management console 118 may be implemented to include a monitoring module 120, a management module 122, an analysis engine 124, and a connectivity management system (CMS) 126, and a priority-based microservices autoscaling system 130, or a combination thereof, as described in greater detail herein. In various embodiments, a CMS client 136, described in greater detail herein may be implemented on certain user devices 'A' 304 through 'x' 314, or certain data center assets 244, or within data centers '1' 346 through 'n' 348, or a combination thereof. In certain embodiments, the CMS 126 may be implemented in combination with a particular CMS client 136 to perform a connectivity management operation, as likewise described in greater detail herein.

As described in greater detail herein, the data center monitoring and management console 118 may be implemented in certain embodiments to perform a data center monitoring and management operation. In certain embodiments, the data center monitoring and management console 118 may be implemented to provide a unified framework for the performance of a plurality of data center monitoring and management operations, by a plurality of users, within a common user interface (UI). In certain embodiments, the data center monitoring and management console 118, and other components of the data center monitoring environment 200, such as the asset configuration system 250, may be implemented to be used by a plurality of users, such as users 'A' 302 through 'x' 312 shown in FIG. 3. In various embodiments, certain data center personnel, such as users 'A' 302 through 'x' 312, may respectively interact with the data center monitoring and management console 118, and other components of the data center monitoring and management environment 200, through the use of an associated user device 'A' 304 through 'x' 314.

In certain embodiments, such interactions may be respectively presented to users 'A' 302 through 'x' 312 within a user interface (UI) window 306 through 316, corresponding to user devices 'A' 304 through 'x' 314. In certain embodiments the UI window 306 through 316 may be implemented in a window of a web browser, familiar to skilled practitioners of the art. In certain embodiments, a data center monitoring and management application (MMA) 310 through 320, described in greater detail herein, may be respectively implemented on user devices 'A' 304 through 'x' 314. In certain embodiments the UI window 306 through 316 may be respectively implemented as a UI window of the data center MMA 310 through 320. In certain embodiments, the data center MMA 310 through 320 may be implemented to interact in combination with the data center monitoring and management console 118, and other components of the data center monitoring and management environment 200, to perform a data center monitoring and management operation. In various embodiments, performance of the data center monitoring and management operation may include the performance of a priority-based microservices autoscaling operation, described in greater detail herein.

In certain embodiments, the interactions with the data center monitoring and management console 118, and other components of the data center monitoring and management environment 200, may respectively be presented as a graphical representation 308 through 318 within UI windows 306 through 316. In various embodiments, such interactions may be presented to users 'A' 302 through 'x' 312 via a display device 324, such as a projector or large display screen. In certain of these embodiments, the interactions may be presented to users 'A' 302 through 'x' 312 as a graphical representation 348 within a UI window 336.

In certain embodiments, the display device 324 may be implemented in a command center 350, familiar to those of skill in the art, such as a command center 350 typically found in a data center or a network operations center (NOC). In various embodiments, one or more of the users 'A' 302 through 'x' 312 may be located within the command center 350. In certain of these embodiments, the display device 324 may be implemented to be generally viewable by one or more of the users 'A' 302 through 'x' 312.

In certain embodiments, the data center monitoring and management operation may be performed to identify the location 350 of a particular data center asset 244. In certain embodiments, the location 350 of a data center asset 244 may be physical, such as the physical address of its associated data center, a particular room in a building at the physical address, a particular location in an equipment rack in that room, and so forth. In certain embodiments, the location 350 of a data center asset 244 may be non-physical, such as a network address, a domain, a Uniform Resource Locator (URL), a file name in a directory, and so forth.

Certain embodiments of the invention reflect an appreciation that it is not uncommon for large organization to have one or more data centers, such as data centers '1' 346 through 'n' 348. Certain embodiments of the invention reflect an appreciation that it is likewise not uncommon for such data centers to have multiple data center system administrators and data center technicians. Likewise, various embodiments of the invention reflect an appreciation that it is common for a data center system administrator to be responsible for planning, initiating, and overseeing the execution of certain data center monitoring and management operations. Certain embodiments of the invention reflect an appreciation that it is common for a data center system administrator, such as user 'A' 302, to assign a particular data center monitoring and management operation to a data center technician, such as user 'x' 312, as a task to be executed.

Certain embodiments of the invention reflect an appreciation that it is likewise common for a data center administrator, such as user 'A' 302, to assume responsibility for performing a particular data center monitoring and management operation. As an example, a data center administrator may receive a stream of data center alerts, each of which is respectively associated with one or more data center issues. To continue the example, several of the alerts may have an initial priority classification of "critical." However, the administrator may notice that one such alert may be associated with a data center issue that is more critical, or time sensitive, than the others and should be remediated as quickly as possible. Accordingly, the data center administrator may elect to assume responsibility for remediating the data center issue, and as a result, proceed to perform an associated data center remediation operation at that time instead of assigning it to other data center personnel.

Certain embodiments of the invention reflect an appreciation that the number of data center assets 244 in a particular data center '1' 346 through 'n' 348 may be quite large. Furthermore, it is not unusual for such data center assets 244 to be procured, deployed, configured, and implemented on a scheduled, or as needed, basis. It is likewise common for certain existing data center assets 244 to be replaced, upgraded, reconfigured, maintained, or remediated on a scheduled, or as-needed, basis. Likewise, certain embodiments of the invention reflect an appreciation that such replacements, upgrades, reconfigurations, maintenance, or remediation may be oriented towards hardware, firmware, software, connectivity, or a combination thereof.

For example, a data center system administrator may be responsible for the creation of data center asset 244 procurement, deployment, configuration, and implementation templates, firmware update bundles, operating system (OS) and software application stacks, and so forth. Likewise, a data center technician may be responsible for receiving a procured data center asset 244, transporting it to a particular data asset location 350 in a particular data center '1' 346 through 'n' 348, and implementing it in that location 350. The same, or another, data center technician may then be responsible for configuring the data center asset 244, establishing network connectivity, applying configuration files, and so forth. To continue the example, the same, or another, data center administrator or technician may be responsible for remediating hardware issues, such as replacing a disc drive in a server or Redundant Array of Independent Disks (RAID) array, or software issues, such as updating a hardware driver or the version of a server's operating system. Accordingly, certain embodiments of the invention reflect an appreciation that a significant amount of coordination may be needed between data center system administrators and data center technicians to assure efficient and reliable operation of a data center.

In various embodiments, certain data center monitoring and management operations may include a data center remediation operation, described in greater detail herein. In certain embodiments, a data center remediation operation may be performed to remediate a particular data asset 244 issue at a particular data asset location 350 in a particular data center '1' 346 through 'n' 348. In certain embodiments, the data center remediation operation may be performed to ensure that a particular data center asset location 350 in a particular data center '1' 346 through 'n' 348 is available for the replacement or upgrade of an existing data center asset 244. As an example, a data center remediation operation may involve deployment of a replacement server that occupies more rack space than the server it will be replacing.

In various embodiments, the data center monitoring and management console 118, or the data center monitoring and management application 310 through 320, or a combination of the two, may be implemented in a failure tracking mode to capture certain data center asset 244 telemetry. In various embodiments, the data center asset 244 telemetry may include data associated with the occurrence of certain events, such as the failure, or anomalous performance, of a particular data center asset 244, or an associated workload 360, in whole, or in part. In certain embodiments, the data center asset 244 telemetry may be captured incrementally to provide a historical perspective of the occurrence, and evolution, of an associated data center issue.

In various embodiments, the data center monitoring and management console 118 may likewise be implemented generate certain remediation operation notes. For example, the data center monitoring and management console 118 may enter certain data center asset 244 remediation instructions in the data center remediation operation notes. In various embodiments, the data center remediation operation notes may be implemented to contain information related to data center asset 244 replacement or upgrade parts, data center asset 244 files that may be needed, installation and configuration instructions related to such files, the physical location 350 of the data center asset 244, and so forth. In certain embodiments, a remediation task 344 may be generated by associating the previously-generated data center remediation operation notes with the remediation documentation, data center asset files, or other remediation resources 342 most pertinent to the data center issue, and the administrator, and any data center personnel selected or its remediation. As used herein, a data center remediation task 344 broadly refers to one or more data center remediation operations, described in greater detail herein, that can be assigned to one or more users 'A' 302 through 'x' 312.

Certain embodiments of the invention reflect an appreciation that a group of data center personnel, such as users 'A' 302 through 'x' 312, will likely possess different skills, certifications, levels of education, knowledge, experience, and so forth. As a result, remediation documentation that is suitable for certain data center personnel may not be suitable for others. For example, a relatively inexperienced data center administrator may be overwhelmed by a massive volume of detailed and somewhat arcane minutiae related to the configuration and administration of multiple virtual machines (VMs) on a large server. However, such remediation documentation may be exactly what a highly skilled and experienced data center administrator needs to remediate subtle server and VM configuration issues.

Conversely, the same highly skilled and experienced data center administrator may be hampered, or slowed down, by being provided remediation documentation that is too simplistic, generalized, or high-level for the data center issue they may be attempting to remediate. Likewise, an administrator who is moderately skilled in configuring VMs may benefit from having step-by-step instructions, and corresponding checklists, when remediating a VM-related data center issue. Accordingly, as used herein, pertinent remediation documentation broadly refers to remediation documentation applicable to a corresponding data center issue that is most suited to the skills, certifications, level of education, knowledge, experience, and so forth of the data center personnel assigned to its remediation.

In various embodiments, the data center monitoring and management console 118 may be implemented to generate a corresponding notification of the remediation task 344. In certain embodiments, the resulting notification of the remediation task 344 assignment may be provided to the one or more users 'A' 302 through 'x' 312 assigned to perform the remediation task 344. In certain embodiments, the notification of the remediation task 344 assignment may be respectively provided to the one or more users 'A' 302 through 'x' 312 within the UI 306 through 316 of their respective user devices 'A' 304 through 'x' 314. In certain embodiments, the notification of the remediation task 344 assignment, and the remediation task 344 itself, may be implemented such that they are only visible to the users 'A' 302 through 'x' 312 to which it is assigned.

In certain embodiments, the data center monitoring and management console 118 may be implemented to operate in a monitoring mode. As used herein, monitoring mode broadly refers to a mode of operation where certain monitoring information provided by the monitoring and management console 118 is available for use by one or more users 'A' 302 through 'x' 312. In certain embodiments, one or more of the users 'A' 302 through 'x' 312 may be command center 350 users. In certain embodiments, the data center monitoring and management console 118 may be implemented to operate in a management mode. As used herein, management mode broadly refers to a mode of operation where certain operational functionality of the data center monitoring and management console 118 is available for use by a user, such as users 'A' 302 through 'x' 312.

Figure 4:
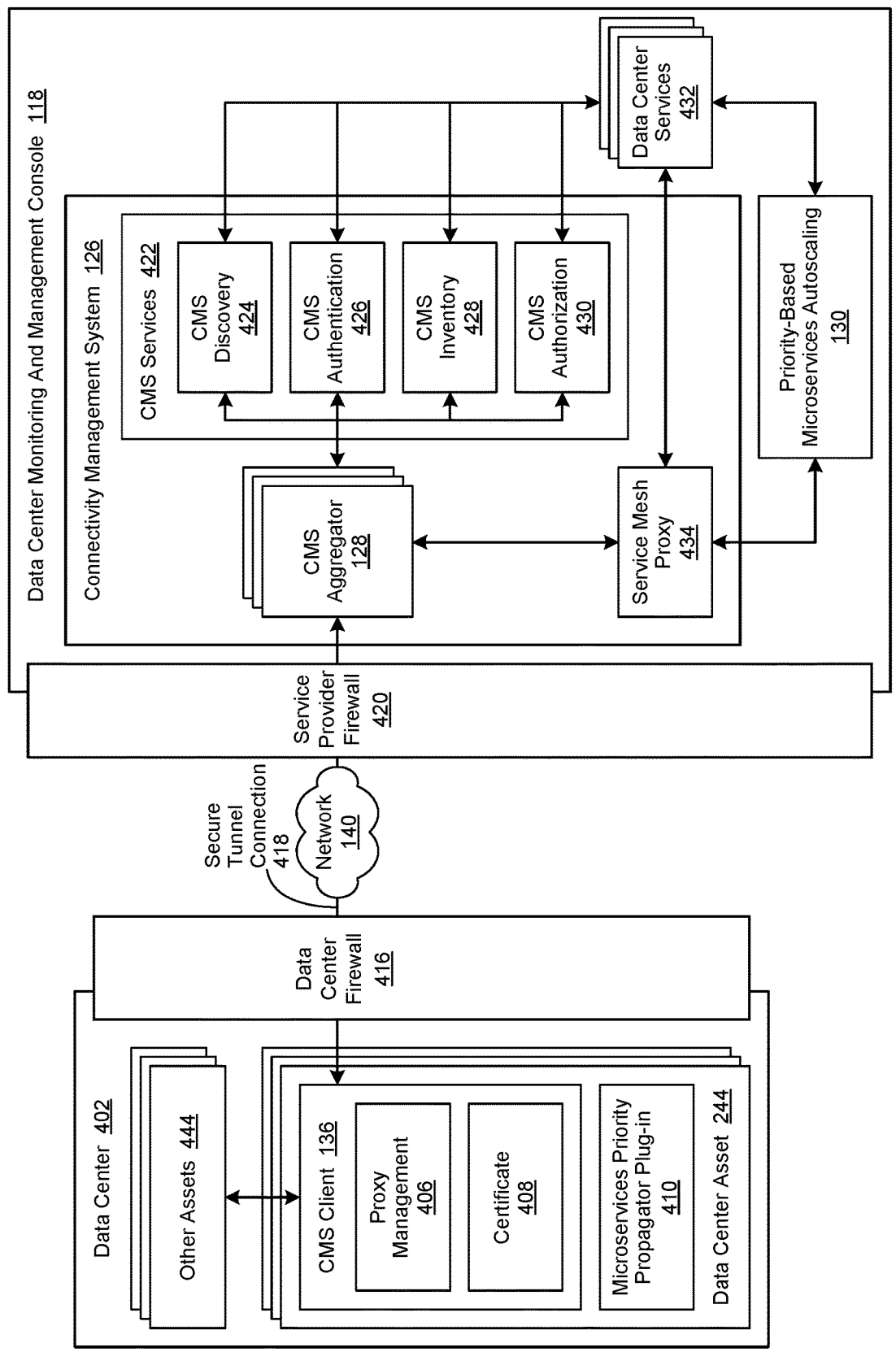
FIG. 4 shows a block diagram of a connectivity management system (CMS)
Figure 5A:
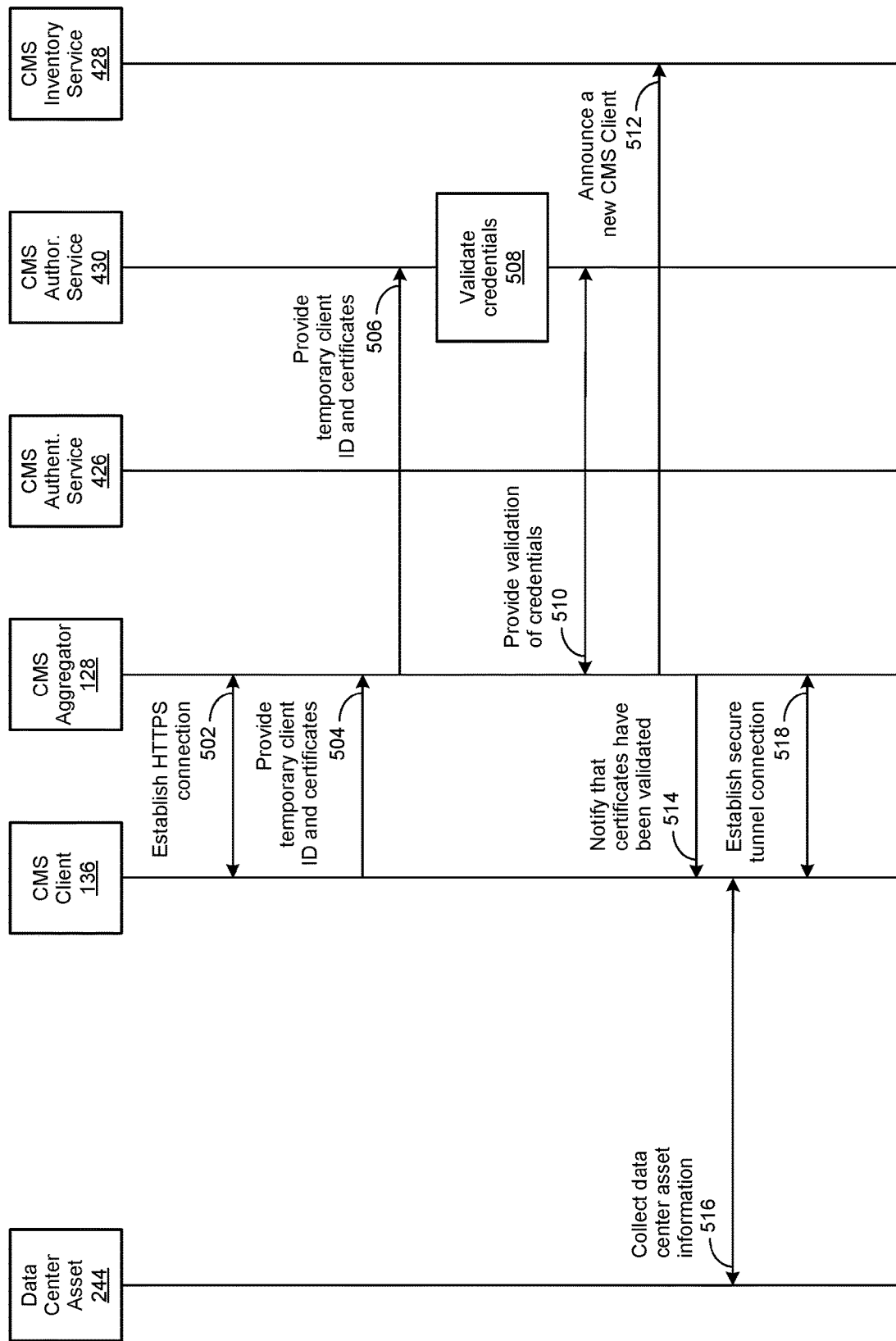
Figure 5B:
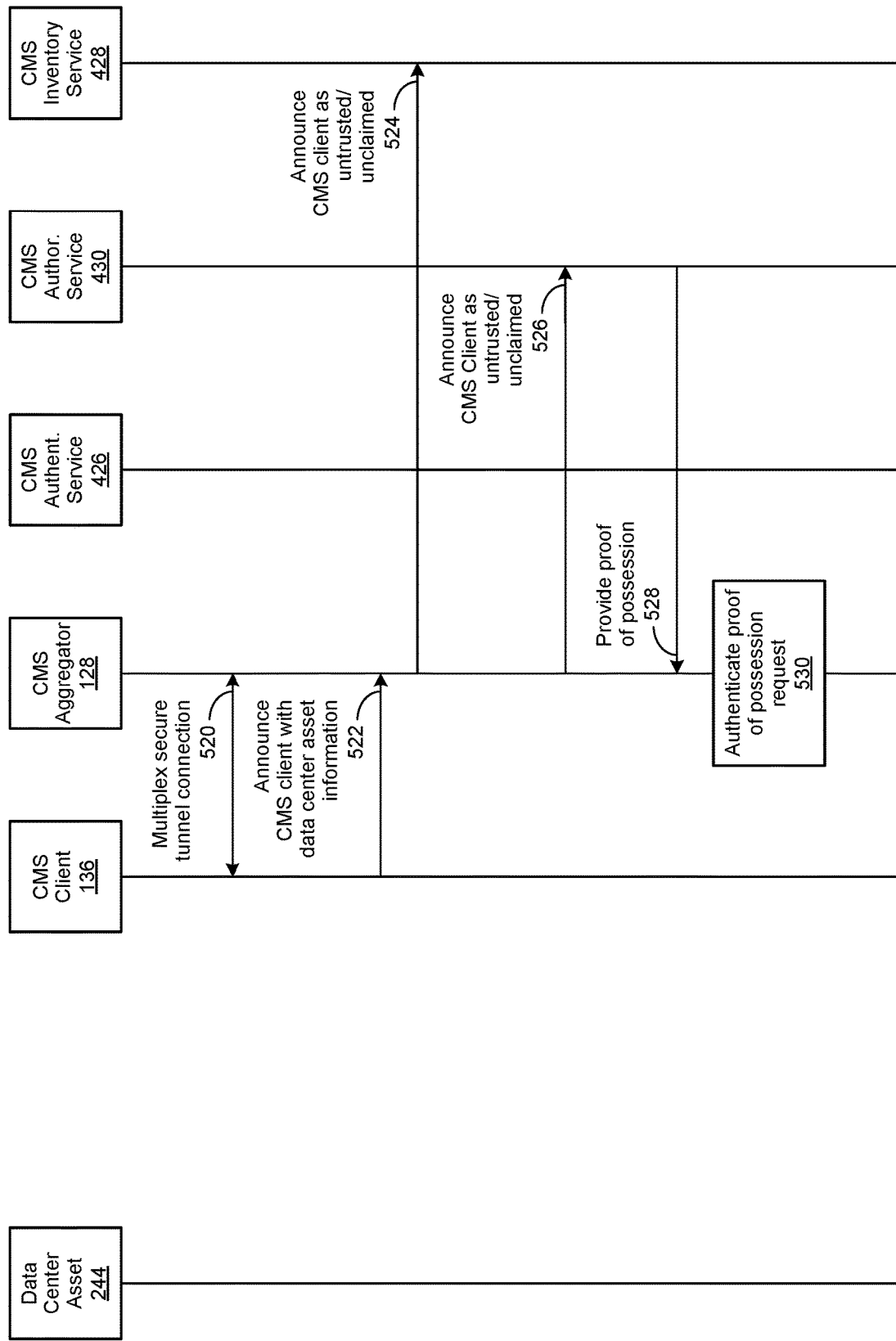
Figure 5D:
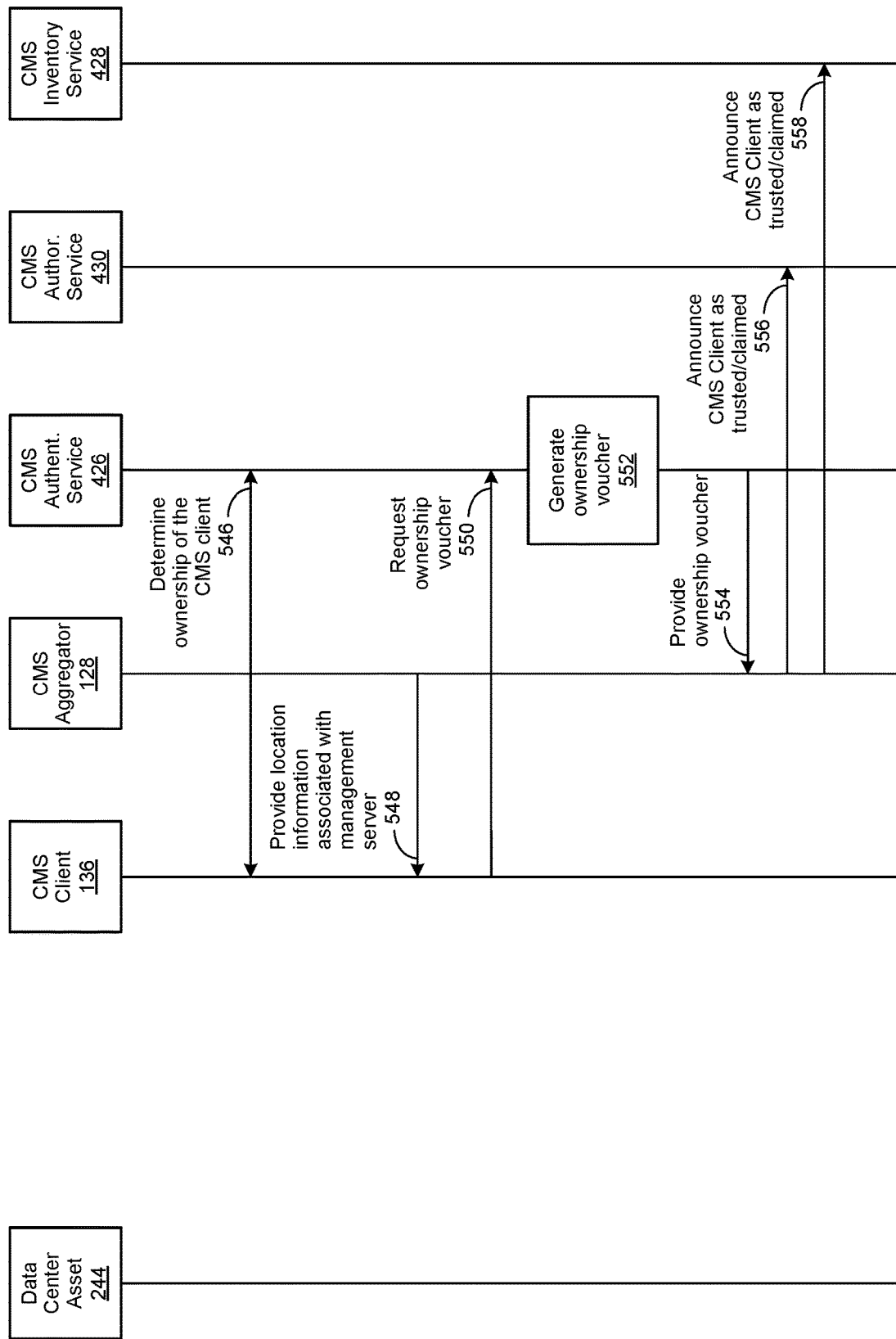

FIG. 4 shows a block diagram of a connectivity management system implemented in accordance with an embodiment of the invention. In various embodiments, a data center monitoring and management console 118, described in greater detail herein, may be implemented to include a connectivity management system (CMS) 126, a priority-based microservices autoscaling system 130, and one or more data center services 432, or a combination thereof. In various embodiments, the CMS 126 may be implemented individually, or in combination with a particular CMS client 136 to perform a connectivity management operation, likewise described in greater detail herein. In various embodiments, one or more connectivity management operations may be performed to initiate, and manage, secure, bi-directional, real-time connectivity between a data center monitoring and management console 118 and a particular data center asset 244, each of which are likewise described in greater detail herein.

In various embodiments, the priority-based microservices autoscaling system 130 may likewise be implemented, individually or in combination with a particular microservices priority propagator plug-in 410, to perform a priority-based microservices autoscaling operation. In certain embodiments, the CMS 126 and the priority-based microservices autoscaling system 130 may likewise be implemented in combination with one another to perform a particular connectivity management operation, or a particular priority-based microservices autoscaling operation, or a combination of the two. As used herein, a priority-based microservices autoscaling operation broadly refers to any function, operation, procedure, or process performed, directly or indirectly, to prioritize the allocation of available compute resources to a particular microservice associated with a corresponding process flow according to its prioritization.

Skilled practitioners of the art will be familiar with microservices, which broadly refer to computer programs that run on a server, or a virtual computer instance, and respond to network requests. In general, microservices are an architectural and organizational approach to software development where a workload, such as a software application, is composed of small, independent services that communicate over well-defined application program interfaces (APIs). Accordingly, microservices address known limitations of monolithic software architectures by taking a modular approach to software development to reimagine workloads as a combination of individual, yet interconnected, services.

In typical usage, each microservice can be deployed independently, implemented to provide a particular functionality, store and process data using different approaches, and be written in different programming languages, or a combination thereof As a result, known microservices approaches allow large workloads to be split into smaller portions, or modules, that communicate with one another via lightweight APIs as they execute. Furthermore, since microservices execute independently, they can be deployed, updated, and automatically scaled according to the demand for the functionality each provides.

Various embodiments of the invention reflect an appreciation that such autoscaling of microservices is based upon the availability of compute resources, which in certain on-premise or edge computing environments may be limited. Furthermore, certain embodiments of the invention reflect an appreciation that currently known approaches to microservices autoscaling fail to take into consideration the prioritization of one workload, and their associated process flows, over another. Accordingly, available compute resources may be indiscriminately consumed when generating instances of microservices for allocation to low priority workloads, which reduces resources available for generating microservices for allocation to higher priority workloads.

In various embodiments, the data center monitoring and management console 118 may be implemented in a cloud environment familiar to skilled practitioners of the art. In certain of these embodiments, the operator of the data center monitoring and management console 118 may offer its various functionalities and capabilities in the form of one or more or more cloud-based data center services 432, described in greater detail herein. In various embodiments, one or more data center assets 244 may be implemented within a data center 402, likewise described in greater detail herein. In certain of these embodiments, the data center 402 may reside on the premises of a user of one or more data center services 432 provided by the operator of the data center monitoring and management console 118.

In various embodiments, the connectivity management system 126 may be implemented to include one or more CMS aggregators 128, one or more CMS services 422, and a service mesh proxy 434, or a combination thereof. In various embodiments, the CMS aggregator 128 may be implemented to interact with one or more of the CMS services 422, as described in greater detail herein. In various embodiments, the data center services 432 may likewise be implemented to interact with one or more of the CMS services 422, and the service mesh proxy 434, or a combination thereof. In certain embodiments, the CMS services 422 may be implemented to include a CMS discovery 424 service, a CMS authentication 426 service, a CMS inventory 428 service, and a CMS authorization 430 service, or a combination thereof.

In various embodiments, one or more data center assets 244 may be implemented within a data center 402, described in greater detail herein. In certain embodiments, the data center 402 may be implemented to include an associated data center firewall 416. In certain embodiments, a CMS client 136, or a microservices priority propagator plug-in module 410, or both, may be implemented on one or more data center assets 244. In certain embodiments, the microservices priority propagator plug-in module 410 may be implemented as a web browser plug-in or as a stand-alone software application.

In various embodiments, the microservices priority propagator plug-in module 410 may be implemented to assign a name to a particular process flow, an associated trace identifier (ID), and a weighted priority, or a combination thereof. In certain of these embodiments, the process flow may be associated with a particular workload, such as a software application. In certain embodiments, the process flow may be implemented to include the use of one or more microservices, described in greater detail herein, in its execution.

In various embodiments, the microservices priority propagator plug-in module 410 may be implemented to collect certain microservices and process flow information associated with the process flow, its associated trace identifier (ID), and its weighted priority, or a combination thereof. In various embodiments, the microservices priority propagator plug-in-module 410 may be implemented to provide the microservices and process flow information to the priority-based microservices autoscaling system 130. In certain of these embodiments, the microservices and process flow information may be provided by the microservices priority propagator plug-in module 410 to the priority-based microservices autoscaling system 130 via the CMS client 136 and the CMS system 126.

In various embodiments, the microservices priority propagator plug-in module 410 may be implemented to embed the microservices and process flow information into a Hypertext Transfer Protocol (HTTP) header familiar to those of skill in the art. In various embodiments, the microservices priority propagator plug-in module 410, or the priority-based microservices autoscaling system 130, may be implemented, individually or in combination with one another, to use the microservices and process flow information to perform a priority-based microservices autoscaling operation, described in greater detail herein. In various embodiments, a priority-based microservices autoscaling operation may be performed by the priority-based microservices autoscaling system 130 to map one or more microservices to a corresponding API call.

In various embodiments, a CMS client 136 or a microservices priority propagator plug-in module 410, or both, implemented on one data center asset 244 may likewise be implemented to enable one or more connectivity management operations, or one or more priority-based microservices autoscaling operations, or a combination thereof, associated with one or more other data center assets 444 that are not respectively implemented with their own CMS client 136 or microservices priority propagator plug-in module 410. In certain of these embodiments, the CMS client 136, or the microservices priority propagator plug-in module 410, or both, may be implemented to assume the identity, and attributes, of a particular data center asset it is directly, or indirectly, associated with.

In various embodiments, the CMS client 136 may be implemented with a proxy management module 406. In certain of these embodiments, the proxy management module 406 may be implemented to manage the CMS client's 136 connectivity to an external network 140 through an intermediary proxy server, or the data center firewall 416, or both. Those of skill in the art will be familiar with a proxy server, which as typically implemented, is a server application that acts as an intermediary between a client, such as a web browser, requesting a resource, such as a web page, from a provider of that resource, such as a web server.

In certain embodiments, the client of a proxy server may be a particular data center asset 244 requesting a resource, such as a particular data center service 432, from the data center monitoring and management console 118. Skilled practitioners of the art will likewise be aware that in typical proxy server implementations, a client may direct a request to a proxy server, which evaluates the request and performs the network transactions needed to forward the request to a designated resource provider. Accordingly, the proxy server functions as a relay between the client and a server, and as such acts as an intermediary.

Those of skill in the art will be aware that proxy servers also assist in preventing an attacker from invading a private network, such as one implemented within a data center 402 to provide network connectivity to, and between, certain data center assets 244. Skilled practitioners of the art will likewise be aware that server proxies are often implemented in combination with a firewall, such as the data center firewall 416. In such implementations, the proxy server, due to it acting as an intermediary, effectively hides an internal network from the Internet, while the firewall prevents unauthorized access by blocking certain ports and programs.

Accordingly, a firewall may be configured to allow traffic emanating from a proxy server to pass through to an external network 140, while blocking all other traffic from an internal network. Conversely, a firewall may likewise be configured to allow network 140 traffic emanating from a trusted source to pass through to an internal network, while blocking traffic from unknown or untrusted external sources. As an example, the data center firewall 416 may be configured in various embodiments to allow traffic emanating from the CMS client 136 to pass, while the service provider firewall 420 may be configured to allow traffic emanating from the CMS aggregator 128 to pass. Likewise, the service provider firewall 420 may be configured in various embodiments to allow incoming traffic emanating from the CMS client 136 to be received, while the data center firewall 416 may be configured to allow incoming network traffic emanating from the CMS aggregator 128 to be received.

In various embodiments, a particular CMS aggregator 128 may be implemented in combination with a particular CMS client 136 to provide a split proxy that allows an associated data center asset 244 to securely communicate with a data center monitoring and management console 118. In various embodiments, the split proxy may be implemented in a client/server configuration. In certain of these embodiments, the CMS client 136 may be implemented as the client component of the client/server configuration and the CMS aggregator 128 may be implemented as the server component. In certain of these embodiments, one or more connectivity management operations may be respectively performed by the CMS aggregator 128 and the CMS client 136 to establish a secure tunnel connection 418 through a particular network 140, such as the Internet.

In various embodiments, the secure tunnel connection 418 may be initiated by the CMS client 136 first determining the address of the CMS aggregator 128 it intends to connect to. In these embodiments, the method by which the address of the CMS aggregator 128 is determined is a matter of design choice. Once the address of the CMS aggregator 128 is determined, the CMS client 136 uses it to establish a secure Hypertext Transport Protocol (HTTPS) connection with the CMS aggregator 128 itself.

In response, the CMS aggregator 128 sets its HTTPS Transport Layer Security (TLS) configuration to "request TLS certificate" from the CMS client 136, which triggers the CMS client 136 to provide its requested TLS certificate 408. In certain embodiments, the CMS authentication 426 service may be implemented to generate and provision the TLS certificate 408 for the CMS client 136. In certain embodiments, the CMS client 136 may be implemented to generate a self-signed TLS certificate if it has not yet been provisioned with one from the CMS authentication 426 service.

In various embodiments, the CMS client 136 may then provide an HTTP header with a previously-provisioned authorization token. In certain embodiments, the authorization token may have been generated and provisioned by the CMS authentication 426 service once the CMS client has been claimed. As used herein, a claimed CMS client 136 broadly refers to a particular CMS client 136 that has been bound to an account associated with a user, such as a customer, of one or more data center services 432 provided by the data center monitoring and management console 118.

In certain embodiments, a CMS client 136 may be implemented to maintain its claimed state by renewing its certificate 408 and being provided an associated claim token. In these embodiments, the frequency, or conditions under which, a CMS client's certificate 408 is renewed, or the method by which it is renewed, or both, is a matter of design choice. Likewise, in these same embodiments, the frequency, or conditions under which, an associated claim token is generated, or the method by which it is provided to a CMS client 136, or both, is a matter of design choice.

In various embodiments, the CMS client 136 may be implemented to have a stable, persistent, and unique identifier (ID) after it is claimed. In certain of these embodiments, the CMS client's 136 unique ID may be stored within the authorization token. In these embodiments, the method by the CMS client's 136 unique ID is determine, and the method by which it is stored within an associated authorization token, is a matter of design choice.

Once the CMS client 136 has been claimed, it may be implemented to convert the HTTPS connection to a Websocket connection, familiar to those of skill in the art. After the HTTP connection has been converted to a Websocket connection, tunnel packet processing is initiated and the CMS aggregator 128 may then perform a Representational State Transfer (REST) request the CMS client 136 to validate its certificate 408. In certain embodiments, the validation of the CMS client's 136 certificate 408 is performed by the CMS authorization 430 service.

In various embodiments, the validation of the CMS client's 136 certificate 408 is performed to determine a trust level for the CMS client 136. In certain of these embodiments, if the CMS client's 136 certificate 408 is validated, then it is assigned a "trusted" classification. Likewise, if CMS client's 136 certificate 408 fails to be validated, then it is assigned an "untrusted" classification.

Accordingly, certain embodiments of the invention reflect an appreciation that "trusted" and "claimed," as used herein as they relate to a CMS client 136 are orthogonal. More specifically, "trust" means that the channel of communication can be guaranteed. Likewise, "claimed" the CMS client 136 can be authenticated and bound to a user, or customer, of one or more data center services 432 provided by the data center monitoring and management console 118.

In various embodiments, the resulting secure tunnel connection 418 may be implemented to provide a secure channel of communication through a data center firewall 416 associated with a particular data center 402 and a service provider firewall 420 associated with a particular data center monitoring and management console 118. In various embodiments, the CMS client 136, the secure tunnel connection 418, and the CMS aggregator 128 may be implemented to operate at the application level of the Open Systems Interconnection (OSI) model, familiar to those of skill in the art. Skilled practitioners of the art will likewise be aware that known approaches to network tunneling typically use the network layer of the OSI model. In certain embodiments, the CMS client 136 and the CMS aggregator 128 may be implemented to end logical events over the secure tunnel connection 418 to encapsulate and multiplex individual connection streams and associated metadata.

In various embodiments, the CMS discovery 424 service may be implemented to identify certain data center assets 244 to be registered and managed by the data center monitoring and management console 118. In various embodiments, the CMS discovery 424 service may be implemented to detect certain events published by a CMS aggregator 128. In certain embodiments, the CMS discovery 424 service may be implemented to maintain a database (not shown) of the respective attributes of all CMS aggregators 128 and CMS clients 136. In certain embodiments, the CMS discovery 424 service may be implemented to track the relationships between individual CMS clients 136 and the CMS aggregators 128 they may be connected to.

In various embodiments, the CMS discovery 424 service may be implemented to detect CMS client 136 connections and disconnections with a corresponding CMS aggregator 128. In certain of these embodiments, a record of such connections and disconnections is stored in a database (not shown) associated with the CMS inventory 428 service. In various embodiments, the CMS discovery 424 service may be implemented to detect CMS aggregator 128 start-up and shut-down events. In certain of these embodiments, a record of related Internet Protocol (IP) addresses and associated state information may is stored in a database (not shown) associated with the CMS inventory 428 service.

In various embodiments, the CMS authentication 426 service may be implemented to include certain certificate authority (CA) capabilities. In various embodiments, the CMS authentication 426 service may be implemented to generate a certificate 408 for an associated CMS client 136. In various embodiments, the CMS authentication 426 service may be implemented to use a third party CA for the generation of a digital certificate for a particular data center asset 244. In certain embodiments, the CMS inventory 428 service may be implemented to maintain an inventory of each CMS aggregator 128 by an associated unique ID. In certain embodiments, the CMS inventory 428 service may likewise be implemented to maintain an inventory of each CMS client 136 by an associated globally unique identifier (GUID).

In various embodiments, the CMS authorization 430 service may be implemented to authenticate a particular data center asset 244 by requesting certain proof of possession information, and then processing it once it is received. In certain of these embodiments, the proof of possession information may include information associated with whether or not a particular CMS client 136 possesses the private keys corresponding to an associated certificate 408. In various embodiments, the CMS authorization 430 service may be implemented to authenticate a particular CMS client 136 associated with a corresponding data center asset 244. In certain of these embodiments, the CMS authorization 430 service may be implemented to perform the authentication by examining a certificate 408 associated with the CMS client 136 to ensure that it has been signed by the CMS authentication 426 service.

In various embodiments, the service mesh proxy 434 may be implemented to integrate knowledge pertaining to individual data center assets 244 into a service mesh such that certain data center services 432 have a uniform method of transparently accessing them. In various embodiments, the service mesh proxy 434 may be implemented with certain protocols corresponding to certain data center assets 244. In certain embodiments, the service mesh proxy 434 may be implemented to encapsulate and multiplex individual connection streams and metadata over the secure tunnel connection 418. In certain embodiments, these individual connection streams and metadata may be associated with one or more data center assets 244, one or more data center services 432, one or more CMS clients 136, and one or more CMS aggregators 128, or a combination thereof.

FIGS. 5a through 5d are a sequence diagram showing the performance of certain connectivity management operations implemented in accordance with an embodiment of the invention. In this embodiment, the CMS client 136 establishes a secure Hypertext Transfer Protocol (HTTPS) connection with the CMS aggregator 128 in step 502, as described in greater detail herein, followed by the provision of its temporary client ID and its previously-provisioned digital certificate to the CMS aggregator in step 504.

The CMS aggregator 128 then provides the CMS client 136 ID and (self-signed) digital certificate to the CMS authorization 430 service for authentication in step 506. Once the CMS client's 136 credentials have been validated in step 508, notification of their validation is provided to the CMS aggregator 128 by the CMS authorization 430 service in step 510. In response, the CMS aggregator 128 announces a new CMS client 136 to the CMS inventory 428 service in step 512, followed by the CMS aggregator 128 notifying the CMS client 136 that its digital certificate has been validated in step 514. The CMS client 136 then collects certain information from the data center asset 244 and in step 516, followed by establishing a secure tunnel connection with the CMS aggregator 128 in step 518, which is then multiplexed in step 520, as described in greater detail herein.

Thereafter, the CMS client 136 announces itself to the CMS aggregator 128 and provides it the collected data center asset information in step 522. In turn, the CMS aggregator 128 announces the CMS client 136 as being in an untrusted/unclaimed state, first to the CMS inventory 428 service in step 524, and then to the CMS authorization 430 service in step 526. In turn, the CMS authorization 430 service then requests the CMS aggregator 128 to provide proof of possession in step 528. In response, the CMS aggregator 128 authenticates the proof of possession request in step 530 and the CMS authentication 426 service generates a CMS-signed digital certificate in step 530.

The resulting CMS-signed digital certificate is then provided by the CMS authentication service 426 to the CMS aggregator 128 in step 534. In turn, the CMS aggregator 128 respectively provides the proof of possession and the CMS-signed digital certificate to the CMS client 136 in steps 536 and 538. In response, the CMS client 136 announces itself to be in a trusted/unclaimed state to the CMS aggregator 128 in step 540. In turn, the CMS aggregator 128 announces the CMS client 136 to be in a trusted/unclaimed state to the CMS authorization 430 service in step 542 and to the CMS inventory 428 service in step 544.

The CMS authentication 426 service then determines ownership of the CMS client 136 in step 546, followed by the CMS aggregator 128 providing certain location information associated with the management server to the CMS client 136 in step 548. In turn, the CMS client 136 requests an ownership voucher from the CMS authentication 426 service in step 550. In response, the CMS authorization 430 generates an ownership voucher in step 552 and provides it to the CMS client 136 in step 554. Once it receives the ownership voucher, the CMS client 136 respectively announces itself as trusted/claimed to the CMS authorization service 430 and the CMS inventory 428 service in steps 556 and 558.

Figure 6A:
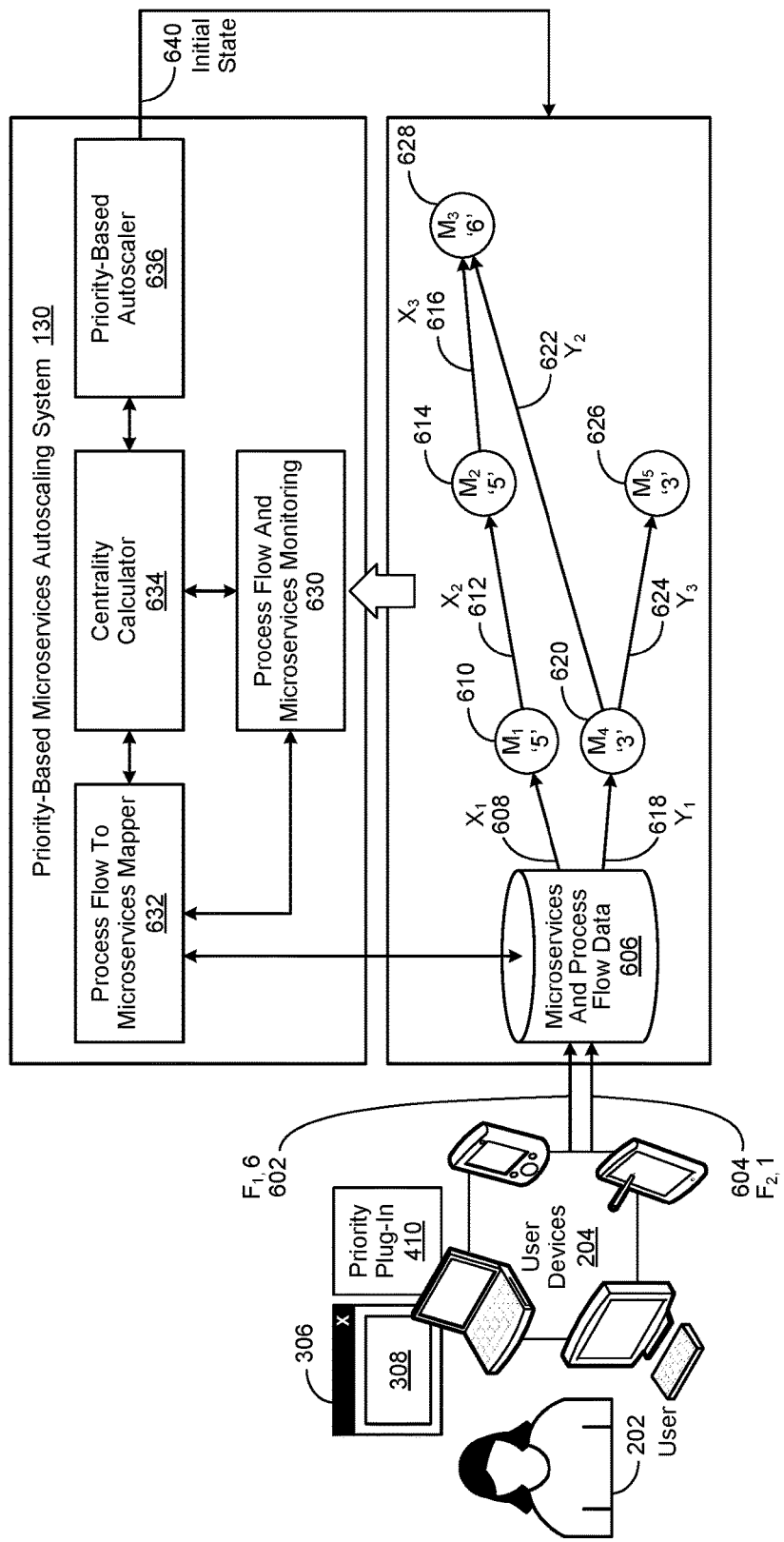
FIGS. 6a and 6b, generally referred to as FIG. 6, show a simplified block diagram of a priority-based microservices autoscaler system implemented to prioritize the autoscaling of certain microservices for a particular process flow.
Figure 6B:
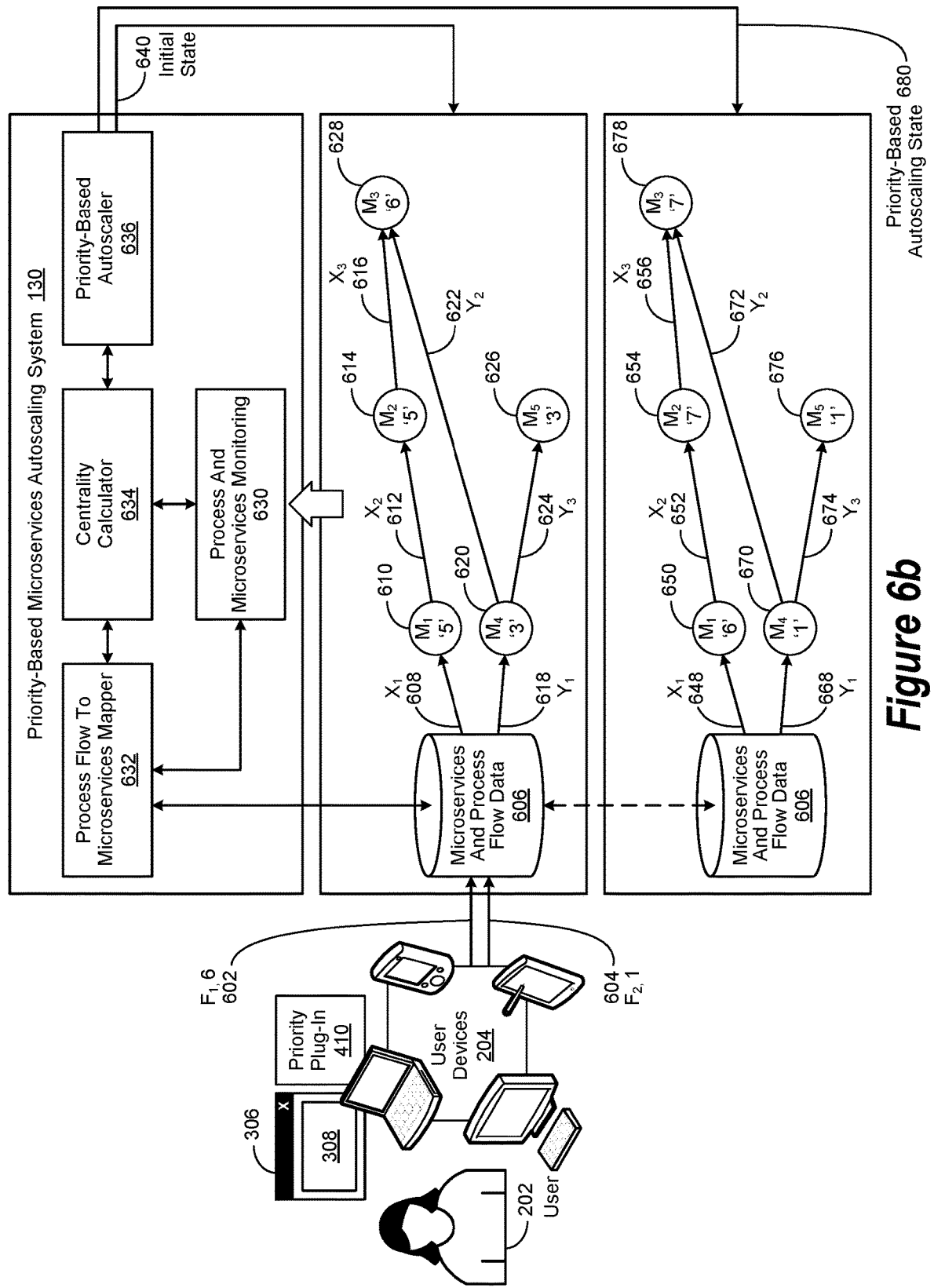

FIGS. 6a and 6b show a simplified block diagram of a priority-based microservices autoscaler system implemented in accordance with an embodiment of the invention to prioritize the autoscaling of certain microservices for a particular process flow. Various embodiments of the invention reflect an appreciation that determining which microservices to autoscale according to the prioritization of one associated process flow over another can often prove challenging. For example, it is not uncommon for a particular workload to have numerous workflows, each of which may involve the use of literally hundreds of microservices during its performance. Consequently, manually defining the autoscaling prioritization for each microservice according to the prioritization of its associated workflow can quickly become impractical. Furthermore, certain embodiments of the invention reflect an appreciation that process flows are often defined by users 202, while the topology of a microservices architecture is typically controlled by engineers or developers, which can introduce additional complexities.

Accordingly, a microservices priority-based propagator plug-in 410 may be implemented in various embodiments to enable a user 202, such as a cloud-based datacenter management services customer, or a business analyst, to define the priority of certain microservices-based process flows. In certain of these embodiments, the microservices priority-based propagator plug-in 410 may be implemented as a plug-in to a web browser implemented on a user device 204. In various embodiments, the microservices priority-based propagator plug-in 410 may be implemented in a user interface (UI) window 308 of a UI 306 associated with a particular user device 204.

In various embodiments, a priority-based microservices autoscaling system 130 may be implemented, as described in greater detail herein, to identify microservices associated with each microservices-based process flow. In certain embodiments, the priority-based microservices autoscaling system 130 may likewise be implemented to determine the criticality of those microservices according to the prioritization of their associated process flows. Likewise, the priority-based microservices autoscaling system 130 may be implemented in various embodiments to use certain information associated with such prioritizations, along with the number of Application Program Interface (API) calls for each involved microservice, to determine its centrality. Skilled practitioners of the art will be familiar with the concept of centrality, which in graph theory broadly refers to the assignment of numbers or rankings to nodes corresponding to their position within a graph. Accordingly, the higher a particular microservice's centrality, the higher its autoscaling priority, and likewise, the higher its number of instances, the more available it will be for autoscaling.

Various embodiments of the invention reflect an appreciation that a practical and effective approach to autoscaling microservices according to the criticality, or prioritization, of a particular process flow may be highly advantageous when compute resources are limited or otherwise constrained. In particular, various embodiments of the invention reflect an appreciation that certain microservices may be involved in two or more different process flows, each of which differ in criticality, or prioritization, which may in turn result in challenges deciding which process flow receives microscervices autoscaling prioritization. In certain of these embodiments, the volume of API calls for a particular microservice may be a factor in determining which process flow should receive microservices autoscaling prioritization. Likewise, the allocation of compute resources between different microservices may be managed, or adjusted in various embodiments regardless of a process flow's respective prioritization. In these embodiments, the method by which such compute resources is managed, or adjusted, is a matter of design choice.

Referring now to FIG. 6a, the priority-based microservices autoscaling system 130 may be implemented in certain embodiments to include a process flow and microservices monitoring 630 module, a process flow to microservices mapper 632 module, a centrality calculator 634 module, and a priority-based autoscaler 636 module, or a combination thereof. In various embodiments, the process flow and microservices monitoring 630 module may be implemented to monitor the performance of one or more process flows and the occurrence of their corresponding microservices Application Programming Interface (API) calls. In various embodiments, priority-based microservices autoscaling operations may be begun by a user 202 selecting two or more process flows that use one or more microservices for prioritization from a repository of microservices and process flow data 606. A name is then assigned to each selected process flow, such as "$F_1$, 6" 602 and "$F_2$, 1" 604, along with an associated trace identifier (ID) and a weighted priority. In various embodiments, the weighted priority of a particular process flow may be referenced in its assigned name. As an example, the process flow names of "$F_1$, 6" 602 and "$F_2$, 1" 604 respectively indicate that they have a prioritization of '6' and '1', with '6' indicating a higher prioritization than '1.'

In certain of these embodiments, the microservices priority propagator plug-in 410 may be implemented to assign the name, trace ID, and weighted priority to each selected process flow. In various embodiments, the process flow's name, its trace ID, and its weighted priority, may be assigned automatically, semi-automatically, or manually, or a combination thereof. In these embodiments, the method by which the process flow name, its trace ID, and its weighted priority, is determined and assigned is a matter of design choice.

In various embodiments, the microservices priority propagator plug-in 410 may be implemented to store each process flow's name, its trace ID, and its weighted priority in the repository of microservices and process flow data 606. In various embodiments, the microservices priority propagator plug-in 410 may be implemented to provide each process flow's name, its trace ID, and its weighted priority to the process flow to microservices mapper 632 module. In various embodiments, the process flow to microservices mapper 632 module may be implemented to retrieve each process flow's name, its trace ID, and its weighted priority from the process flow from the repository of microservices and process flow data 606. In these embodiments, the method by which the process flow to microservices mapper 632 module receives each process flow's name, its trace ID, and its weighted priority is a matter of design choice.

In this embodiment, the process flow and microservices monitoring 630 module may be implemented to collect certain process flow and associated microservices API call information when monitoring the performance of process flows "$F_1$, 6" 602 and "$F_2$, 1." In various embodiments, the process flow and microservices monitoring 630 module may be implemented to may likewise be implemented to provide the process flow and microservices API call information it may collect to the process flow to microservices mapper 632 module. In various embodiments, the process flow to microservices mapper 632 module may be implemented to use the process flow and microservices API call information it may receive, along with certain other information it may retrieve from the repository of microservices and process flow data 608, to map microservices associated with the identified microservices API calls to each of the selected process flows. In various embodiments, the process flow to microservices mapper 632 module may be implemented to use the trace ID associated with each of the selected process flows to map microservices associated with the identified microservices API calls to each of the selected process flows. Examples known approaches for using the trace ID to map microservices associated with the identified microservices API calls to each of the selected process flows include Zipkin, Dynatrace, and New Relic.

In certain of these embodiments, the process flow to microservices mapper 632 module may be implemented to provide the resulting microservices mapping information to the centrality calculator 634 module. In various embodiments, the centrality calculator 634 module may be implemented to use certain microservices mapping information it receives from the process flow to microservices mapper 632 module to calculate the centrality of each microservice associated with each of the previously selected process flows to establish an initial autoscaling state 640. For example, as shown in FIGS. 6a and 6b, microservices API calls $X_1$ 608, $X_2$ 612, and $X_3$ 616 associated with process flow "$F_1$, 6" 602 are mapped to microservices $M_1$ 610, $M_2$ 614, and $M_3$ 628, which respectively have '5', '5', and '6' instances. Likewise, microservices API call $Y_1$ 608, which is associated with process flow "$F_2$, 1" 604 is mapped to microservice $M_4$ 620, which has '3' instances, while microservices API calls $Y_2$ 622 and $Y_3$ 624 are respectively mapped to microservices $M_4$ 620 and $M_5$ 626, which both have '3' instances.

In various embodiments, the process and microservices monitoring 630 module 630 may be implemented to perform ongoing monitoring of the selected process flows for new microservices API calls. In these embodiments, if a new microservices API call is detected, then a determination may be made to determine whether sufficient compute resources are available to initiate a new instance of its associated microservice. If so, then autoscaling operations are performed to initiate a new instance of the microservice associated with the microservices API call and ongoing monitoring of the selected process flows for new microservices API calls is continued.

However, if it was determined sufficient compute resources are not available to initiate a new instance of the called microservice, then the centrality calculator 634 module may be implemented in various embodiments to calculate the centrality of all currently running, and newly-called, microservices associated with the previously selected process flows. In various embodiments, the centrality calculator 634 module may be implemented to maintain a raw weighted priority counter value for each microservice associated with each selected process flow. In various embodiments, the centrality calculator 634 module may be implemented to match any new microservices API calls against the process flow and microservices API call information it has previously received from the process flow to microservices mapper 632 module, or retrieved from the repository of microservices and process flow data 606, or a combination thereof.

In various embodiments, the centrality calculator 634 module may be implemented to calculate the weighted priority of any newly-called microservice. In various embodiments, the centrality calculator 634 module may likewise be implemented to increase a microservice's weighted priority counter value by the weighted priority of its associated process flow. In various embodiments, the centrality of each microservice may be defined as the value of its raw weighted priority counter value above the value normalized by an input normalization parameter N. Accordingly, all microservices' centrality value will be mapped to the range [1, 2 . . . N].

In various embodiments, such normalization may be performed by taking the maximal raw weighted priority counter values across all microservices and dividing them into N equal ranges, such that such that the raw priority counter for any particular microservice fall into one of the N equal ranges. In these embodiments, the index of each equal range is the microservice centrality. Various embodiments of the invention reflect an appreciation that if the value of N is not passed to the centrality calculator 634 module, it is assumed to be equal to the maximal raw weighted priority counter value across all microservices, which is effectively equal to canceling the normalization.

For example, assume process flow "$F_1$, 6" 602 involves microservices $M_1$ 610 and $M_2$ 614, each of which has a priority of '10' and was invoked 500 times, and process flow "$F_2$, 1" 604 involves microservice $M_3$ 628, which has a priority of 4 and was invoked 250 times, and the input normalization parameter N=10, then:

The raw priority of $M_1$ 610 and $M_2$ 614 are 10*500=5000 and the raw priority of $M_3$ 628 is 4*250=1000

Likewise, the 10 equal ranges of 5000/10=500 units are [0-500], [500-1000] . . . [4500-5000].

Accordingly, the raw priority of $M_1$ and $M_2$ falls into the range with index '10', giving a microservice centrality for microservices $M_1$ 610 and $M_2$ 614 of '10'. Likewise, the raw priority of $M_3$ 628 falls into range with index '2' giving a microservice centrality for microservice $M_3$ 628 of '2.'

In various embodiments, the priority-based autoscaler 636 module may be implemented to determine whether sufficient compute resources are available to initiate a new instance of a particular microservice. If not, then the priority-based autoscaler 636 module may be implemented to query the centrality calculator 634 module in order to determine the centrality of each microservice currently in use, calculate the number of instances each microservice is allowed to be running, and either terminate or initiate relevant microservices, or both, according to the previous prioritization of their associated process flows. For example, as shown in FIG. 6b, microservices API calls $X_1$ 648, $X_2$ 652, and $X_3$ 656 associated with process flow "$F_1$, 6" 602 are mapped to microservices $M_1$ 650, $M_2$ 654, and $M_3$ 678, which now respectively have '6', '7', and '7' instances in a resulting priority-based autoscaling state 680. Likewise, microservices API call $Y_1$ 668, which is associated with process flow "$F_2$, 1" 604 is mapped to microservice $M_4$ 670, which now has '1' instance, while microservices API calls $Y_2$ 672 and Y₃ 674 are respectively mapped to microservices M₄ 670 and M₅ 676, which both now have '1' instance.

In various embodiments, the centrality calculator 634 module may be implemented to use a higher centrality first approach to initiating or terminating microservice instances according to the prioritization of their associated process flows. In these embodiments, the number of microservice instances that are currently active in the initial autoscaling state 640 is known, and no more compute resources are available for allocation, so it is not possible to initiate additional instances of microservices. Accordingly, the priority-based autoscaler 636 module may be implemented in various embodiments to review a list of involved microservices, ordered by their centrality, starting with the highest, or most critical microservices. If the microservice's scale out condition is satisfied (e.g., compute load is below 80 percent) it will be skipped.

Otherwise, the list of microservices will be reviewed beginning with microservice having the lowest centrality, or the least criticality, until a microservice is identified that has more instances running than required, which will then be terminated. In its place, the priority-based autoscaler 636 module may then be implemented to initiate one or more instances of the most critical microservice. The process will then be completed until the number of the most critical microservices and the number of the least critical microservices reaches equilibrium. Various embodiments of the invention reflect an appreciation that the advantage of this approach is that the most critical microservices will receive unlimited priority for initiating new instances. However, various embodiments of the invention likewise reflect an appreciation that the disadvantage of this approach is that lower priority microservices may be left with a bare minimum number of instances, resulting in an imbalance of most and least critical microservices in operation.

In various embodiments, the centrality calculator 634 module may be implemented to use a balanced allocation by centrality approach to initiating or terminating microservice instances according to the prioritization of their associated process flows. In these embodiments, the number of microservice instances that are currently active in the initial autoscaling state 640 is likewise known, and no more compute resources are available for allocation, so it is not possible to initiate additional instances of microservices. Accordingly, the priority-based autoscaler 636 module may be implemented in various embodiments to let the total number of microservices instances that is currently active be represented by a value of T, with centrality between [1 . . . N] be represented by $C(i)$, and the number of the microservices with this centrality be represented by $M(i)$.

Likewise, the total number of microservices instances available for redistribution A will be defined as the total number of all active microservices instances T minus the total number of minimum required microservices instances R, such that A=T−R. Accordingly, per each microservice centrality $C(i)$ between [1 . . . N] the number of instances that will be allocated to each microservice with this centrality is:

$$A*C(i)/\Sigma_{i=1}^{N}C(i)*M(i)$$

In various embodiments, the resulting value may be rounded down and remaining instances, as a result of such rounding, if applicable, will be distributed starting with the microservices with higher centrality to those with lower centrality. For example, if total amount of instances N is 33 and there are two microservices M₁ and M₂, each with a centrality of '5', and one microservice M₃ with a centrality of '20', and each microservice requires minimum 1 instance then:

The total number of microservices instances available for redistribution A is 33−3=30.

Accordingly, microservices M₁ and M₂ will receive 30*5/(5*2+20*1)='5' instances each, and microservice M₃ will receive 30*20/(5*2+20*1)='20' instances. With the addition of '1' required instance for each microservice:

Microservices M₁ and M₂ will have 5+1='6' instances each, and microservice M₃ will have 20+1='21' instances.

Various embodiments of the invention reflect an appreciation that this approach, as opposed to a higher centrality satisfaction approach, will not guarantee that the optimal requirements of the microservices with the highest centrality will be fully satisfied. However, it allows microservice centrality to be taken into account for achieving a more balanced allocation of microservices instances. Skilled practitioners of the art will recognize that many such embodiments and examples are possible. Accordingly, the foregoing is not intended to limit the spirit, scope, or intent of the invention.

Figure 7A:
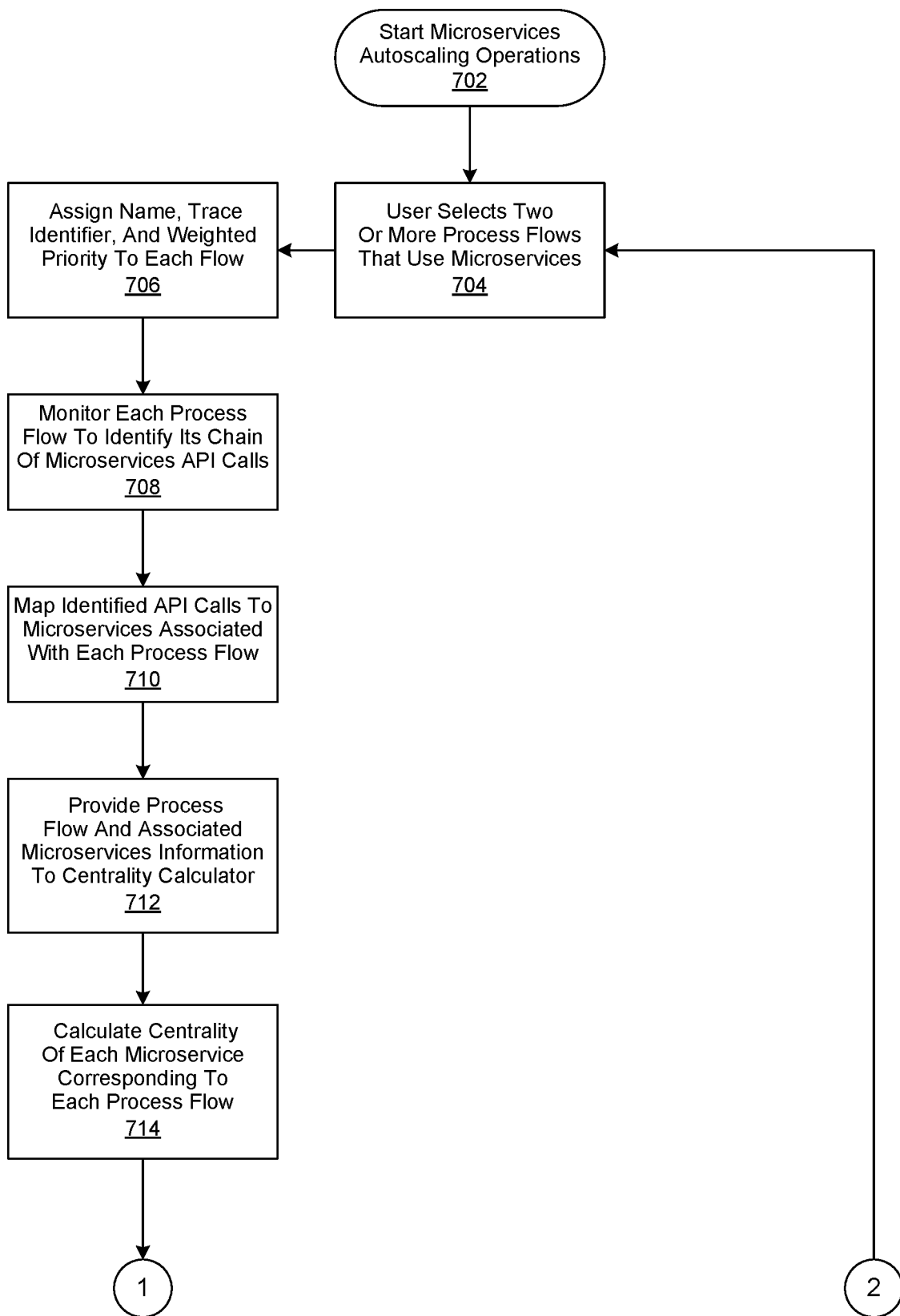
FIGS. 7a and 7b, generally referred to as FIG. 7, show a simplified flowchart of the performance of priority-based microservices autoscaling operations.
Figure 7B:
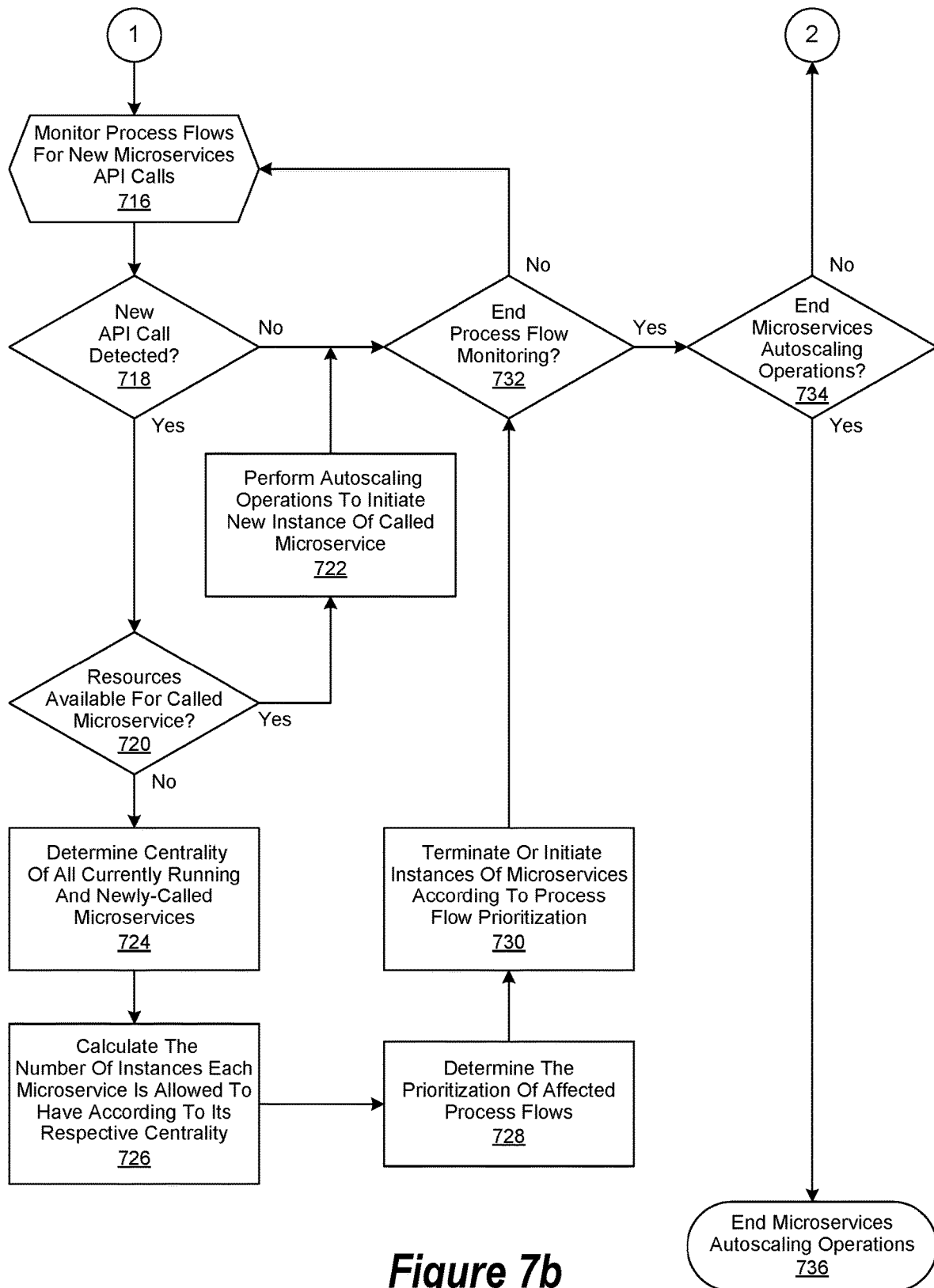

FIGS. 7a and 7b, generally referred to as FIG. 7, show a simplified flowchart of the performance of priority-based microservices autoscaling operations. In this embodiment, priority-based microservices autoscaling operations are be begun in step 702, followed by a user selecting two or more process flows in step 704 that use one or more microservices. A name is then assigned to each selected process flow, along with a trace identifier (ID), and a weighted priority in step 706. In certain of these embodiments, a microservices priority propagator, described in greater detail herein, may be implemented to assign a name, trace ID, and weighted priority to a particular process flow. In various embodiments, the process flow's name, its trace ID, and its weighted priority, may be assigned automatically, semi-automatically, or manually, or a combination thereof. In these embodiments, the method by which the process flow name, its trace ID, and its weighted priority, is determined and assigned is a matter of design choice.

Thereafter, each of the selected process flows are monitored in step 708 to identify their respective chains of microservices Application Program Interface (API) calls. The identified microservices API calls are then processed in step 710 to map their associated microservices to each of the selected process flows. In various embodiments, a process flow to microservices mapper module, likewise described in greater detail herein, may be implemented to map microservices associated with the identified microservices API calls to each of the selected process flows Then, in step 712, the process flow and associated microservices information is provided to a centrality calculator, described in greater detail herein, which is then used in step 714 to calculate the centrality of each microservice associated with each process flow, as likewise described in greater detail herein. Ongoing operations are then performed in step 716 to monitor the selected process flows for new microservices API calls. A determination is then made in step 718 whether a new microservices API call is detected. If not, then a determination is made in step 732 whether to end ongoing operations to monitor the selected process flows. If not, then the process is continued, proceeding with step 716. Otherwise, a determination is made in step 734 whether to end priority-based microservices autoscaling operations. If not, then the process is continued, proceeding with step 704. Otherwise, priority-based microservices autoscaling operations are ended in step 736.

However, if it was determined in step 718 that a new microservices API call was detected, then a determination is made in step 720 whether sufficient compute resources are available to initiate an instance of the called microservice. In various embodiments, the method by which it is determined whether or not sufficient compute resources are available to initiate an instance of the called microservice is a matter of design choice. If it is determined in step 720 that there are sufficient compute resources to initiate an instance of the called microservice, then autoscaling operations are performed in step 722 to initiate a new instance of the called microservice. In various embodiments, the method by which such autoscaling are performed in a matter of design choice. The process is then continued, proceeding with step 732.

However, if it was determined in step 720 that sufficient compute resources are not available to initiate a new instance of the called microservice, then the centrality of all currently running, and newly-called, microservices is determined in step 724, as described in greater detail herein. The number of instances each microservice is allowed to have according to its respective centrality is then calculated in step 726, as described in greater detail herein, followed by determining the respective prioritization of each affected process flow in step 728, likewise as described in greater detail herein. Thereafter, instances of microservices are either terminated or initiated, or both, in step 730 according to the previous prioritization of their associated process flows. The process is then continued, proceeding with step 732.

As will be appreciated by one skilled in the art, the present invention may be embodied as a method, system, or computer program product. Accordingly, embodiments of the invention may be implemented entirely in hardware, entirely in software (including firmware, resident software, microcode, etc.) or in an embodiment combining software and hardware. These various embodiments may all generally be referred to herein as a "circuit," "module," or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example, but not limited to, an electronic, magnetic, optical, electromagnetic, infrared, or semiconductor system, apparatus, or device. More specific examples (a non-exhaustive list) of the computer-readable medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, or a magnetic storage device. In the context of this document, a computer-usable or computer-readable medium may be any medium that can contain, store, communicate, or transport the program for use by or in connection with the instruction execution system, apparatus, or device.

Computer program code for carrying out operations of the present invention may be written in an object oriented programming language such as Java, Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

Embodiments of the invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

Consequently, the invention is intended to be limited only by the spirit and scope of the appended claims, giving full cognizance to equivalents in all respects.

What is claimed is:

1. A computer-implementable method for performing a data center management and monitoring operation, comprising:
   identifying a plurality of process flows, each of the plurality of process flows having a trace identifier and a corresponding weighted priority;
   identifying a plurality of microservices associated with each of the plurality of process flows;

mapping each of the plurality of microservices associated with each of the plurality of process flows; and, calculating a centrality value for each of the plurality of microservices associated with each of the plurality of process flows based upon the mapping; and wherein the corresponding weighted priority of each of the plurality of process flows is used when calculating the centrality value for the plurality of microservices associated with the process flow.

2. The method of claim 1, further comprising:

identifying application program interfaces associated with each of the plurality of microservices associated with each of the plurality of process flows; and, using the identified application program interfaces when mapping each of the plurality of microservices associated with each of the plurality of process flows.

3. The method of claim 1, wherein:

the mapping each of the plurality of microservices associated with each of the plurality of process flows comprises arranging the each of the plurality of microservices in a graph.

4. The method of claim 3, wherein:

each of the plurality of microservices are represented as respective nodes within the graph.

5. The method of claim 4, wherein:

the centrality value for each of the plurality of microservices associated with each of the plurality of process flows is calculated based upon an interrelationship between nodes within the graph.

6. A system comprising:

a processor;

a data bus coupled to the processor;

a data center asset client module; and, a non-transitory, computer-readable storage medium embodying computer program code, the non-transitory, computer-readable storage medium being coupled to the data bus, the computer program code interacting with a plurality of computer operations and comprising instructions executable by the processor and configured for:

identifying a plurality of process flows, each of the plurality of process flows having a trace identifier and a corresponding weighted priority;

identifying a plurality of microservices associated with each of the plurality of process flows;

mapping each of the plurality of microservices associated with each of the plurality of process flows; and, calculating a centrality value for each of the plurality of microservices associated with each of the plurality of process flows based upon the mapping; and wherein the corresponding weighted priority of each of the plurality of process flows is used when calculating the centrality value for the plurality of microservices associated with the process flow.

7. The system of claim 6, wherein the instructions executable by the processor are further configured for:

identifying application program interfaces associated with each of the plurality of microservices associated with each of the plurality of process flows; and, using the identified application program interfaces when mapping each of the plurality of microservices associated with each of the plurality of process flows.

8. The system of claim 6, wherein:

the mapping each of the plurality of microservices associated with each of the plurality of process flows comprises arranging the each of the plurality of microservices in a graph.

9. The system of claim 8, wherein:

each of the plurality of microservices are represented as respective nodes within the graph.

10. The system of claim 9, wherein:

the centrality value for each of the plurality of microservices associated with each of the plurality of process flows is calculated based upon an interrelationship between nodes within the graph.

11. A non-transitory, computer-readable storage medium embodying computer program code, the computer program code comprising computer executable instructions configured for:

identifying a plurality of process flows, each of the plurality of process flows having a trace identifier and a corresponding weighted priority;

identifying a plurality of microservices associated with each of the plurality of process flows;

mapping each of the plurality of microservices associated with each of the plurality of process flows; and, calculating a centrality value for each of the plurality of microservices associated with each of the plurality of process flows based upon the mapping; and wherein the corresponding weighted priority of each of the plurality of process flows is used when calculating the centrality value for the plurality of microservices associated with the process flow.

12. The non-transitory, computer-readable storage medium of claim 11, wherein the computer executable instructions are further configured for:

identifying application program interfaces associated with each of the plurality of microservices associated with each of the plurality of process flows; and, using the identified application program interfaces when mapping each of the plurality of microservices associated with each of the plurality of process flows.

13. The non-transitory, computer-readable storage medium of claim 11, wherein:

the mapping each of the plurality of microservices associated with each of the plurality of process flows comprises arranging the each of the plurality of microservices in a graph.

14. The non-transitory, computer-readable storage medium of claim 13, wherein:

each of the plurality of microservices are represented as respective nodes within the graph.

15. The non-transitory, computer-readable storage medium of claim 14, wherein:

the centrality value for each of the plurality of microservices associated with each of the plurality of process flows is calculated based upon an interrelationship between nodes within the graph.

16. The non-transitory, computer-readable storage medium of claim 11, wherein:

the computer executable instructions are deployable to a client system from a server system at a remote location.

17. The non-transitory, computer-readable storage medium of claim 11, wherein:

the computer executable instructions are provided by a service provider to a user on an on-demand basis.

* * * * *